US012081967B2

(12) United States Patent
Murugesan et al.

(10) Patent No.: US 12,081,967 B2
(45) Date of Patent: Sep. 3, 2024

(54) METHODS, ACCESS POINT DEVICE AND STATION DEVICE FOR CLOSED Wi-Fi HOTSPOT NETWORK

(71) Applicant: SAMSUNG ELECTRONICS CO., LTD., Suwon-si (KR)

(72) Inventors: Kumar Murugesan, Bangalore (IN); Kavin Kumar Thangadorai, Bangalore (IN); Srihari Sriram, Bangalore (IN); Radhika Mundra, Bangalore (IN); Mayank Kumar Sahu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 17/804,536

(22) Filed: May 27, 2022

(65) Prior Publication Data
US 2022/0322081 A1    Oct. 6, 2022

Related U.S. Application Data

(63) Continuation of application No. PCT/KR2022/004381, filed on Mar. 29, 2022.

(30) Foreign Application Priority Data

Apr. 1, 2021   (IN) .............................. 202141015646
Mar. 18, 2022  (IN) .............................. 202141015646

(51) Int. Cl.
*H04W 12/03* (2021.01)
*H04L 9/08* (2006.01)
(Continued)

(52) U.S. Cl.
CPC ........... *H04W 12/03* (2021.01); *H04L 9/0827* (2013.01); *H04L 9/0869* (2013.01); *H04W 12/06* (2013.01);
(Continued)

(58) Field of Classification Search
CPC ..... H04W 12/03; H04W 12/06; H04W 76/10; H04W 84/12; H04W 12/069;
(Continued)

(56) References Cited

U.S. PATENT DOCUMENTS 7,277,547 B1    10/2007  Delker et al.
10,972,196 B1 *  4/2021  Chu ....................... H04B 17/27
(Continued)

FOREIGN PATENT DOCUMENTS

EP           1411674 A1     4/2004

OTHER PUBLICATIONS

Extended European Search Report for EP 22781555.2 by European Patent Office dated Feb. 6, 2024.
(Continued)

*Primary Examiner* — Quazi Farooqui
(74) *Attorney, Agent, or Firm* — BROADVIEW IP LAW, PC

(57) ABSTRACT

Disclosed herein is a method, an Access Point (AP) device for creating a closed Wireless Fidelity (Wi-Fi) hotspot network, and a method, a station device for connecting to the closed Wi-Fi hotspot network. The AP device receives a first input for creating the closed Wi-Fi hotspot network, transmits an encryption key to the station device, which is present within a predefined region, over an in-band communication medium or an out-of-band communication medium, and creates the closed Wi-Fi hotspot network by communicating management frames in cipher text with the station device. The station device receives the encryption key and the management frames from the AP device; and transmits a connection request to the AP device for connecting to the closed Wi-Fi hotspot network. The communication of the
(Continued)

management frames in the cipher text provides improved security against attacks associated with Wi-Fi hotspot networks.

20 Claims, 13 Drawing Sheets

(51) Int. Cl.
*H04W 12/06* (2021.01)
*H04W 76/10* (2018.01)
*H04W 84/12* (2009.01)

(52) U.S. Cl.
CPC ......... *H04W 76/10* (2018.02); *H04L 2209/80* (2013.01); *H04W 84/12* (2013.01)

(58) Field of Classification Search
CPC ... H04W 12/122; H04W 12/64; H04W 12/55; H04W 12/0431; H04W 48/08; H04L 9/0827; H04L 9/0869; H04L 2209/80; H04L 63/1458; H04L 63/18; H04L 9/0631; H04L 9/0637; H04L 9/083; H04L 9/0833; H04L 9/3215
See application file for complete search history.

(56) References Cited

U.S. PATENT DOCUMENTS

| | | |
|---|---|---|
| 2007/0264965 A1* | 11/2007 | Taniguchi ............. H04W 12/06 455/403 |
| 2008/0008143 A1 | 1/2008 | Robertson et al. |
| 2014/0181904 A1* | 6/2014 | Craig .................. H04L 63/0892 726/3 |
| 2020/0077258 A1* | 3/2020 | Doyle ................ H04L 63/0428 |
| 2020/0153686 A1* | 5/2020 | Sarda .................... H04W 12/37 |
| 2020/0187008 A1* | 6/2020 | Ding ..................... H04W 12/03 |
| 2021/0014234 A1 | 1/2021 | Kwatra et al. |
| 2021/0021996 A1 | 1/2021 | Li |
| 2021/0258877 A1* | 8/2021 | Chitrakar .......... H04W 52/0216 |

OTHER PUBLICATIONS

IEEE Std 802.11. "Part 11: Wireless LAN Medium Access Control (MAC) and Physical Layer (PHY) specifications—Amendment 6: Medium Access Control (MAC) Security Enhancements." IEEE Computer Society. Jul. 23, 2004.

* cited by examiner

METHODS, ACCESS POINT DEVICE AND STATION DEVICE FOR CLOSED Wi-Fi HOTSPOT NETWORK

CROSS-REFERENCE TO RELATED APPLICATIONS

This application is a continuation of pending PCT International Application number PCT/KR2022/004381, filed on Mar. 29, 2022, which is based on and claims the benefit of an Indian Provisional Patent Application No. 202141015646 filed on Apr. 1, 2021 (provisional) and on Mar. 18, 2022 (complete), in the Indian Patent Office, the entire contents of which are incorporated by reference herein in their entirety.

TECHNICAL FIELD

The disclosure generally relates to securing Wi-Fi hotspot network, more particularly, but not exclusively, to a method and an Access Point (AP) device for creating a closed Wi-Fi hotspot network, and a method and a station device for connecting to a closed Wi-Fi hotspot network.

BACKGROUND

In recent years, deployment of Wireless Local Area Networks (WLANs) has significantly increased to meet growing demand for wireless internet access. IEEE 802.11 standard, commercially known as Wi-Fi, lays down architecture of the WLANs and specifies set of Media Access Control (MAC) and physical layer (PHY) protocols for implementing the WLAN. Despite popularity, security is one of the major concerns still associated with Wi-Fi networks. Every year new vulnerabilities have been found in Wi-Fi systems, and it is being patched periodically.

Generally, an Access Point (AP) device creates a Wi-Fi hotspot network, to which one or more station devices get connected to avail internet access. For connecting with the Wi-Fi hotspot network, the one or more station devices retrieve connection information of the AP device such as Service Set Identifier (SSID), supported rates and security type from beacon frames transmitted from the AP device. However, the aforesaid Wi-Fi hotspot networks are vulnerable to security attacks by an intruder, due to transmission of the connection information in the beacon frames in clear text. To overcome this, hidden SSID (also referred to as hidden network) feature has been introduced in the AP device, by virtue of which the SSID is removed from the beacon frame.

However, the hidden SSID feature is limited to beacon frames, and does not remove the SSID from other management frames such as probe frames and association frames, which are also transmitted in clear text. Further, the hidden SSID feature does not protect additional useful information such as AP capability information, security schemes supported, bitmap information, which are present in the one or more management frames. Due to lack of protection, the intruder easily extracts the connection information utilizing eavesdropping tools and performs various attacks such as brute-force attack, Denial-of-Service (DoS) attack, and evil twin attack. Thus, the hidden SSID feature fails to provide security against the aforesaid attacks by the intruder.

FIG. 1A shows an example of eavesdropping by an intruder 105 in an unsecured Wi-Fi hotspot network.

As illustrated in FIG. 1A, a legitimate AP device 101, which is connected to internet 109, communicates management frames in clear text $113_1$, $113_2$ with station devices 103 such as a laptop $103_1$ and a smartphone $103_2$, respectively. As the management frames $113_1$, $113_2$ are transmitted in clear text, the intruder 105 easily obtains connection information of the legitimate AP device 101 such as SSID, and security type using information cracking tools. Further, the intruder 105 sets up a fraudulent AP device 107 which has SSID and security type identical to those of the legitimate AP device 101. The intruder 105 also executes a DoS attack on the legitimate AP device 101, which causes the legitimate AP device 101 to go offline. Thereafter, the station devices $103_1$, $103_2$ get connected to the fraudulent AP device 107 automatically. Here, as the connection information of the fraudulent AP device 107 is identical with those of the legitimate AP device 101, the station devices $103_1$, $103_2$ cannot distinguish the fraudulent AP device 107 from the legitimate AP device 101. Once connected to the fraudulent AP device 107, the station devices $103_1$, $103_2$ are directed to unsecure web portals, through which the intruder 105 steal sensitive information of user or user's credential, and misuse them, which cause significant loss and inconveniences to the user.

FIG. 1B shows an example of a User Interface (UI) of a conventional station device illustrating unsecured Wi-Fi hotspot network names and respective visual icons.

As illustrated in FIG. 1A, the conventional station device is the laptop $103_1$. The laptop $103_1$ is within hotspot range of five legitimate AP devices (not shown in figure), having SSID 'ABC', 'Z45', 'PQR_1', 'MN92', and 'XY3', respectively. For example, the intruder 105 sets up the fraudulent AP device 107 with SSID 'ABC', which is identical to SSID of one of the five legitimate AP devices. When the laptop $103_1$ performs Wi-Fi scanning to discover wireless networks within its vicinity, six visual icons $115_1$, $115_2$, $115_3$, $115_4$, $115_5$, $115_6$ (collectively referred as visual icons 115), representing the Wi-Fi hotspot networks associated with the AP devices, are displayed on the UI $111_1$ of the laptop $103_1$, as illustrated in FIG. 1B. Here, a first visual icon $115_1$ and a fourth visual icon $115_4$ are identical, and have same SSID, that is 'ABC'. As a result, identification of visual icon associated with the legitimate AP device becomes difficult.

The information disclosed in this background section should not be assumed to be an acknowledgement or any form of suggestion that this information forms the prior art already known to a person skilled in the art merely because it is set forth in the background section. The background section may describe aspects or embodiments of the present disclosure.

SUMMARY

The present disclosure discloses a method for creating a closed Wireless Fidelity (Wi-Fi) hotspot network. The method comprises receiving, by an Access Point (AP) device, a first input for creating the closed Wi-Fi hotspot network. Upon receiving the first input, the method comprises transmitting, by the AP device, an encryption key to one or more station devices over an in-band communication medium or an out-of-band communication medium. Here, the one or more station devices are present within a predefined region associated with the AP device. Upon transmitting the encryption key, the method comprises creating, by the AP device, the closed Wi-Fi hotspot network by communicating one or more management frames in cipher text with the one or more station devices.

Further, the present disclosure discloses an AP device for creating a closed Wi-Fi hotspot network. The AP device comprises a processor, and a memory communicatively coupled to the processor. The processor receives a first input for creating the closed Wi-Fi hotspot network. Upon receiving the first input, the processor transmits an encryption key to one or more station devices over an in-band communication medium or an out-of-band communication medium. Here, the one or more station devices are present within a predefined region associated with the AP device. Upon transmitting the encryption key, the processor creates the closed Wi-Fi hotspot network by communicating one or more management frames in cipher text with the one or more station devices.

Additionally, the present disclosure discloses a method for connecting to a closed Wi-Fi hotspot network. The method comprises receiving, by a station device, an encryption key from an AP device over an in-band communication medium or an out-of-band communication medium. Here, the station device is present within a predefined region associated with the AP device. Upon receiving the encryption key, the method comprises receiving, by the station device, one or more management frames in cipher text from the AP device over the closed Wi-Fi hotspot network. Further, the method comprises transmitting, by the station device, a connection request to the AP device for connecting to the closed Wi-Fi hotspot network.

Furthermore, the present disclosure discloses a station device for connecting to a closed Wi-Fi hotspot network. The station device comprises a processor; and a memory communicatively coupled to the processor. The processor receives an encryption key from an Access Point (AP) device over an in-band communication medium or an out-of-band communication medium. The station device is present within a predefined region associated with the AP device. The processor receives one or more management frames from the AP device over the closed Wi-Fi hotspot network upon receiving the encryption key. Further, the processor transmits a connection request to the AP device for connecting to the closed Wi-Fi hotspot network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present disclosure are now described, by way of example only, and regarding the accompanying figures, in which:

Figure 1A:
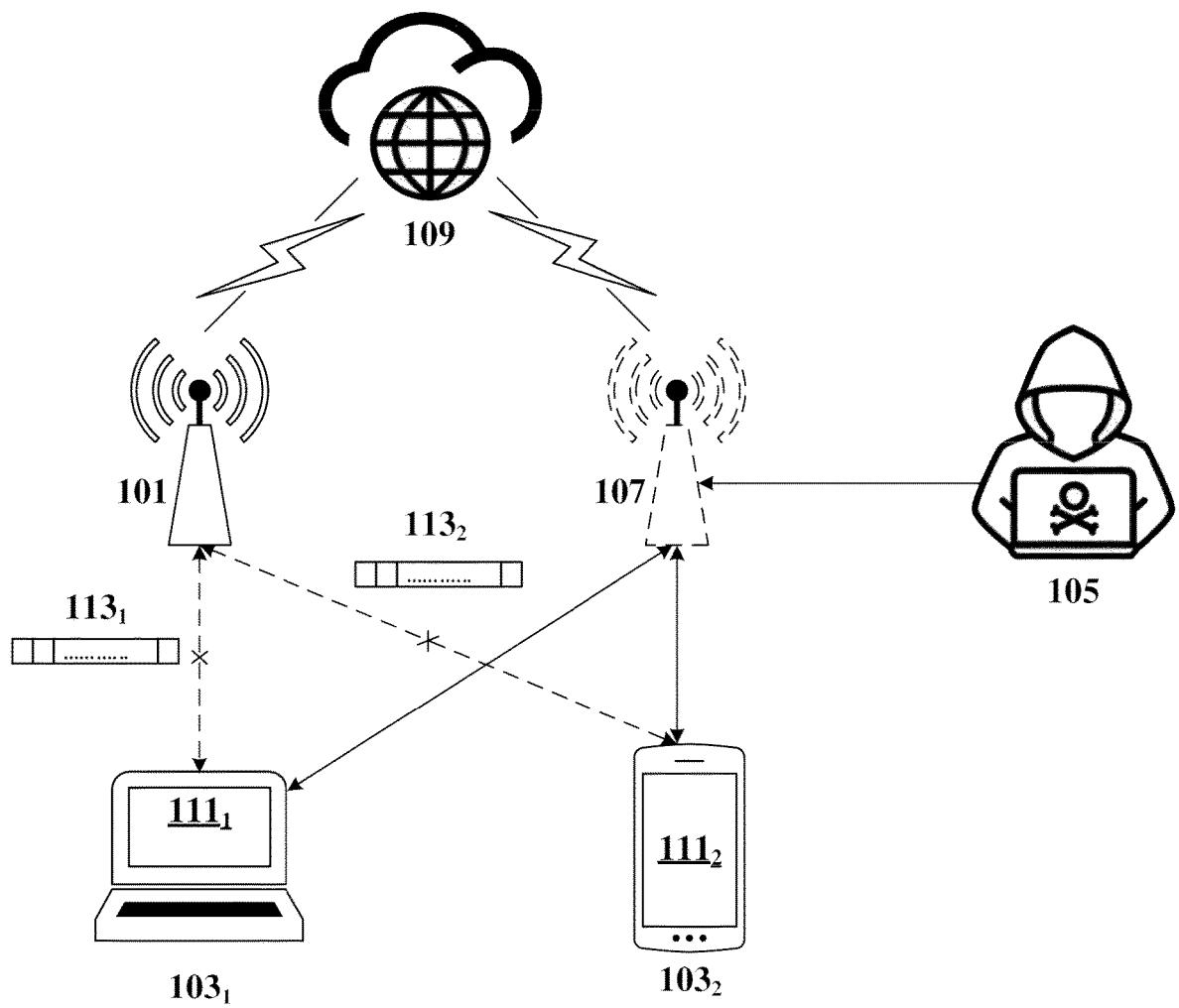
FIG. 1A shows an example of eavesdropping by an intruder in an unsecured Wi-Fi hotspot network.

It should be appreciated by those skilled in the art that any flow diagrams and timing diagrams herein represent conceptual views of illustrative device embodying the principles of the present disclosure. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including", "have", "having", "contains", "containing", "carries", "carrying", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Embodiments of the present disclosure may relate to methods, Access Point (AP) device and station device for closed Wi-Fi hotspot network. In the present disclosure, a closed Wi-Fi hotspot network is created by communicating one or more management frames in cipher text with the station device, instead of clear text. Particularly, a random number-based encryption key is generated at the AP device, and transmitted to the station device over an in-band communication medium or an out-of-band communication medium prior to communicating the one or more management frames. Here, the station device, which is authenticated during in-band key sharing and out-of-band key sharing, decrypts the received one or more management frames utilizing the encryption key and extracts connection information of the AP device for connecting to the closed Wi-Fi hotspot network.

Encryption of the connection information in the one or more management frames, prevents an intruder from eavesdropping and subsequent security attacks such as brute-force attack, Denial-of-Service (DoS) attack, and evil twin attack. Active scanning using probe request and response, and passive scanning do not reveal any useful information about the network, for which the intruder cannot determine weak link or create offline dictionary attacks. As encryption and decryption of the management frames are enabled at both the AP device and authenticated station device, redundant probe requests transmitted from station devices, which are not authenticated by the AP device, are not responded by the AP device. This improves channel utilization and communication throughput. Further, the station device easily distinguishes a fraudulent AP device from a legitimate AP device based on the encryption key, as the encryption key is unique for each Wi-Fi hotspot network.

Figure 2A:
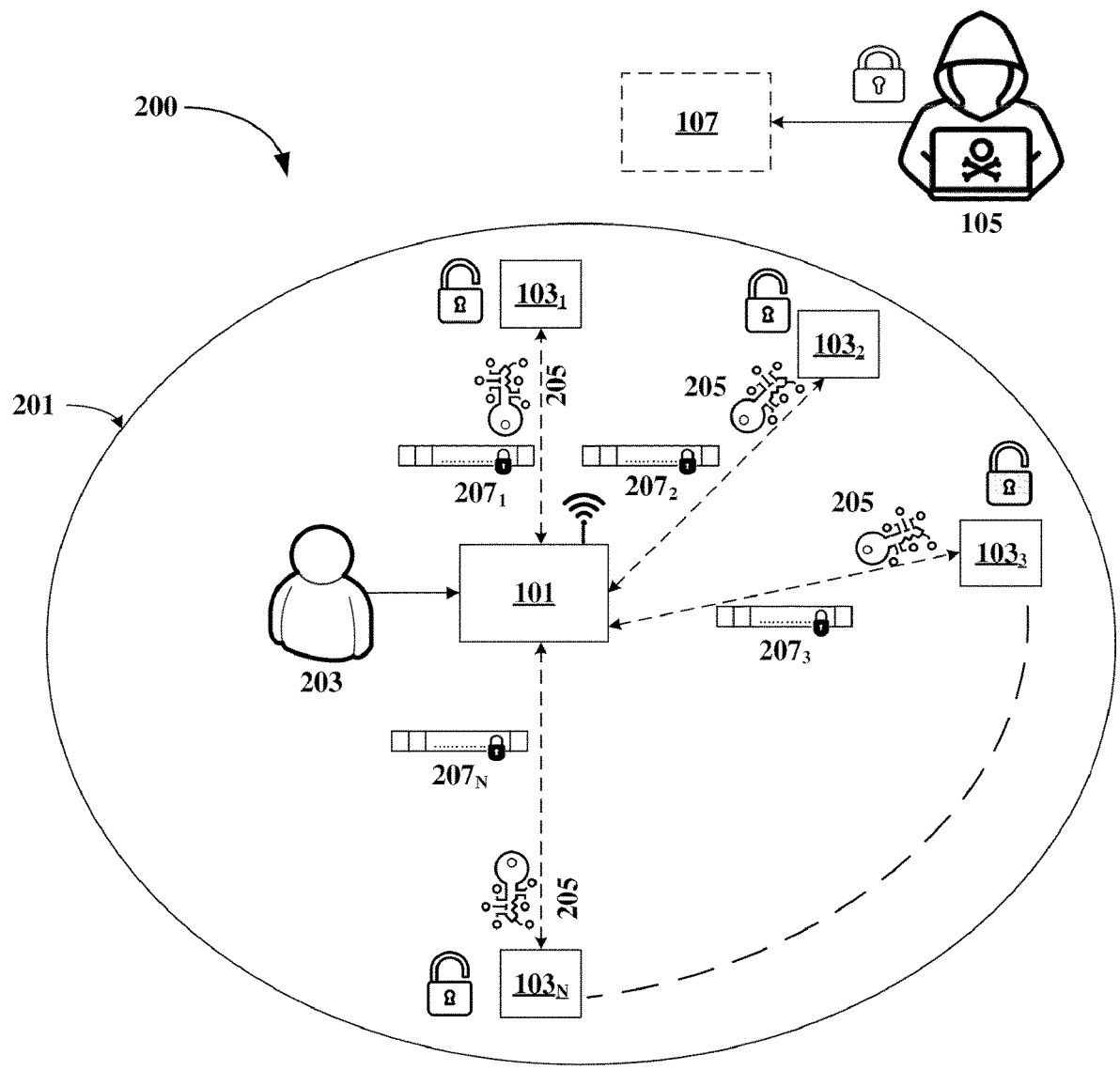
FIG. 2A shows an architecture for creating a closed Wireless Fidelity (Wi-Fi) hotspot network in accordance with some embodiments of the present disclosure.

FIG. 2A shows an architecture for creating a closed Wi-Fi hotspot network in accordance with some embodiments of the present disclosure.

As shown in FIG. 2A, the architecture 200 may comprise an Access Point (AP) device 101, a user 203 associated with the AP device 101, and one or more station devices $103_1$, $103_2$, $103_3$, ..., $103_N$ (collectively referred to as one or more station devices 103). The AP device 101 may have cellular capability and may tether a cellular traffic to a Wi-Fi traffic for providing an internet access to the one or more station devices 103. The AP device 101 may have a wireless Local Area Network (LAN) interface (alternatively referred as to a hotspot interface). The AP device 101 may be connected to a gateway device or a cellular base station via the wireless Local Area Network (LAN) interface. The gateway device may be a Wi-Fi router. The cellular base station may be, but not limited to, a 5G base station (gNB), a 4G base station (eNB), a 3G base station or a 2G base station. Further, the AP device 101 may be communicate with the one or more station devices 103 via the hotspot interface.

As an example, the AP device 101 may be a smartphone. The one or more station devices 103 may include, but is not limited to, a laptop, a desktop, a Personal Digital Assistant (PDA), a tablet, a smartphone, a smartwatch, a smart television, a smart speaker, and an Internet of Things (IoT) device. Each of the one or more station devices 103 may have a Wi-Fi interface for connecting to the AP device 101. The Wi-Fi interface of each of the one or more station devices 103 may be communicatively coupled with the hotspot interface of the AP device 101.

In an embodiment, the AP device 101 may receive a first input for creating the closed Wi-Fi hotspot network 201 from the user 203 associated with the AP device 101. Here, the user 203 may enable the hotspot interface of the AP device 101 prior to providing the first input. The AP device 101 may receive the first input for creating the closed Wi-Fi hotspot network 201 from another device (not shown) associated with the AP device 101. Also, the first input may be generated by the AP device 101 itself when a predetermined requirement is satisfied. Upon receiving the first input, the AP device 101 may extract an encryption key 205 stored in a memory configured in the AP device 101. Alternatively, the AP device 101 may receive a second input for changing a network identification from the user 203 or another device (not shown). Also, the second input may be generated by the AP device itself when a predetermined requirement is satisfied. Upon receiving the second input, the AP device 101 may generate a random number utilizing a random key generator. The AP device 101 may set the generated random number as the encryption key 205.

In an embodiment, the AP device 101 may transmit the encryption key 205 to the one or more station devices 103 over an in-band communication medium or an out-of-band communication medium upon receiving the first input. The one or more station devices 103 may be present within a predefined region associated with the AP device 101. Particularly, the AP device 101 may determine a distance of each of the one or more station devices 103 utilizing, for example, a triangulation positioning method, a trilateration positioning method or a ranging based localization method. Based on the determined distance, the AP device 101 may determine whether the one or more station devices 103 are present within the predefined region associated with the AP device 101. Thereafter, the AP device 101 may transmit the encryption key 205 to the one or more station devices 103 which are present within the predefined region.

To transmit the encryption key 205 to one or more station devices 103 over the in-band communication medium, the AP device 101 may transmit the encryption key 205 in one of a plurality of messages associated with 4-way handshake-based authentication to the one or more station devices 103 over a Wi-Fi network. Here, the AP device 101 may transmit a first message comprising an ANonce to each of the one or more station devices 103 over the Wi-Fi network. In response to transmitting the first message, the AP device 101 may receive a second message comprising a SNonce and a Message Integrity Check (MIC) value from each of the one or more station devices 103 over the Wi-Fi network. Further, the AP device 101 may transmit a third message comprising a Group Transient Key (GTK), an Integrity Group Transient Key (IGTK), and the encryption key 205 to each of the one or more station devices 103 over the Wi-Fi network. Each of the GTK, the IGTK, and the encryption key 205 may be encrypted with a Key Encryption Key (KEK) generated from a Pairwise Transient Key (PTK). The AP device 101 may generate the PTK by applying a pseudo-random function to a prestored Pairwise Master Key (PMK), the ANonce, the SNonce, a Medium Access Control (MAC) address of the AP device 101, and a Medium Access Control (MAC) address of each of the one or more station devices 103. In some embodiments, the AP device 101 may generate the PTK by applying a pseudo-random function to at least one selected from the group of a prestored Pairwise Master Key (PMK), the ANonce, the SNonce, a Medium Access Control (MAC) address of the AP device 101, Medium Access Control (MAC) addresses of the one or more station devices 103, and combination thereof. Upon transmitting the third message, the AP device 101 may receive a fourth message comprising an acknowledgement indicating successful installation of the GTK, IGTK and the encryption key 205 from each of the one or more station devices 103 over the Wi-Fi network.

To transmit the encryption key 205 to the one or more station devices 103 over the out-of-band communication medium, the AP device 101 may authenticate the one or more station devices 103 over a short-range wireless network or a cellular network. Further, the AP device 101 may establish a secure wireless channel with each of the authenticated one or more station devices 103. The AP device 101 may transmit the encryption key 205 to each of the authenticated one or more station devices 103 through the secure wireless channel. As an example, the AP device 101 may transmit the encryption key 205 through Bluetooth, Bluetooth Low Energy (BLE), Wi-Fi Aware, QR code scanning and Short Message Service (SMS).

In an embodiment, the AP device 101 may create the closed Wi-Fi hotspot network 201 by communicating one or more management frames in cipher text $207_1$, $207_2$, $207_3$, . . . , $207_N$ (collectively referred to as one or more management frames 207) with the one or more station devices $103_1$, $103_2$, $103_3$, . . . , $103_N$, respectively, upon transmitting the encryption key 205. Each of the one or more management frames 207 may be a beacon frame, a probe frame, or an association frame. Particularly, the AP device 101 may encrypt one or more Information Elements (IEs) of the one or more management frames 207 utilizing the encryption key 205. The one or more IEs may comprise, capability information, Service Set Identifier (SSID) information, supported rate information, extended supported rate information, Robust Secure Network (RSN) information, Basic Service Set (BSS) load information, and Very High Throughput (VHT) capabilities information. Further, the AP device 101 may broadcast the one or more management frames in the cipher text 207 to the one or more station devices 103. Each of the one or more management frames 207 may comprise a Management Frame Encryption (MFE) IE and the one or more encrypted IEs.

In an embodiment, the AP device 101 may receive a connection request from at least one station device among the one or more station devices 103 in response to broadcasting the one or more management frames 207. The at least one station device may generate the connection request by decrypting the one or more encrypted IEs of the one or more management frames 207 utilizing the encryption key 205. The AP device 101 may create the closed Wi-Fi hotspot network 201 based on the received connection request from the at least one station device. As an example, the AP device 101 may receive a probe request and an association request from the at least one station device. In response, the AP device 101 may send a probe response and an association response to the at least one station device for creating the closed Wi-Fi hotspot network 201.

In an embodiment, the station device, which is present within a predefined region associated with the AP device 101, may receive an encryption key 205 from an Access Point (AP) device over the in-band communication medium or the out-of-band communication medium. Further, the station device may receive one or more management frames 207 from the AP device 101 over the closed Wi-Fi hotspot network 201. Thereafter, the station device may decrypt the one or more encrypted IEs in the received one or more management frames 207 using the received encryption key 205, and may extract connection information of the AP device 101. Here, the station device may detect the MFE IE in the received one or more management frames 207, and may prioritize the AP device 101 among a plurality of AP devices (not shown in figure) for transmitting the connection request. Further, the station device may generate the connection request based on the extracted connection information and a Medium Access Control (MAC) address of the station device. The station device may transmit the generated connection request to the AP device 101 for connecting to the closed Wi-Fi hotspot network 201.

As illustrated in FIG. 2A, an intruder 105 (also referred to as an attacker) cannot perform eavesdropping and extract connection information from the one or more management frames 207 transmitted or broadcasted by the AP device 101. Because the one or more IEs, which carry connection information of the AP device 101, are encrypted with the encryption key 205. Moreover, in absence of the encryption key 205, the intruder 105 may fail to decrypt the one or more management frames 207. Comparing FIG. 2A with FIG. 1A, it is observed that the closed Wi-Fi hotspot network 201 created by the AP device 101 may provide improved security against brute-force attack, Denial-of-Service (DoS) attack and evil twin attack due to communication of the one or more management frames 207 with the one or more station devices 103 in the cipher text, instead of clear text.

As an example, a user 203 associated with a smartphone may enable the hotspot interface on the smartphone. For example, the user 203 may provide a touch input on a touch screen of the smartphone for enabling a closed Wi-Fi feature. The smartphone may determine that a laptop is within 10 meters distance. Accordingly, the smartphone may transmit a 128-bit encryption key 205 to the laptop via Bluetooth. Further, the smartphone may transmit the beacon frame in the cipher text to the laptop. The laptop may receive the MFE in the beacon frame, and may prioritize the smartphone over other AP devices. Further, the laptop may decrypt the beacon frame utilizing the 128-bit encryption key 205, and may extract connection information such as SSID and supported rates. The SSID of the smartphone may be 'ABC', and the supported rates may be 2.4 GHz and 5 GHz. Utilizing the connection information, the laptop may transmit a probe request and an association request to the smartphone for connecting to the closed Wi-Fi hotspot network 201.

Figure 2B:
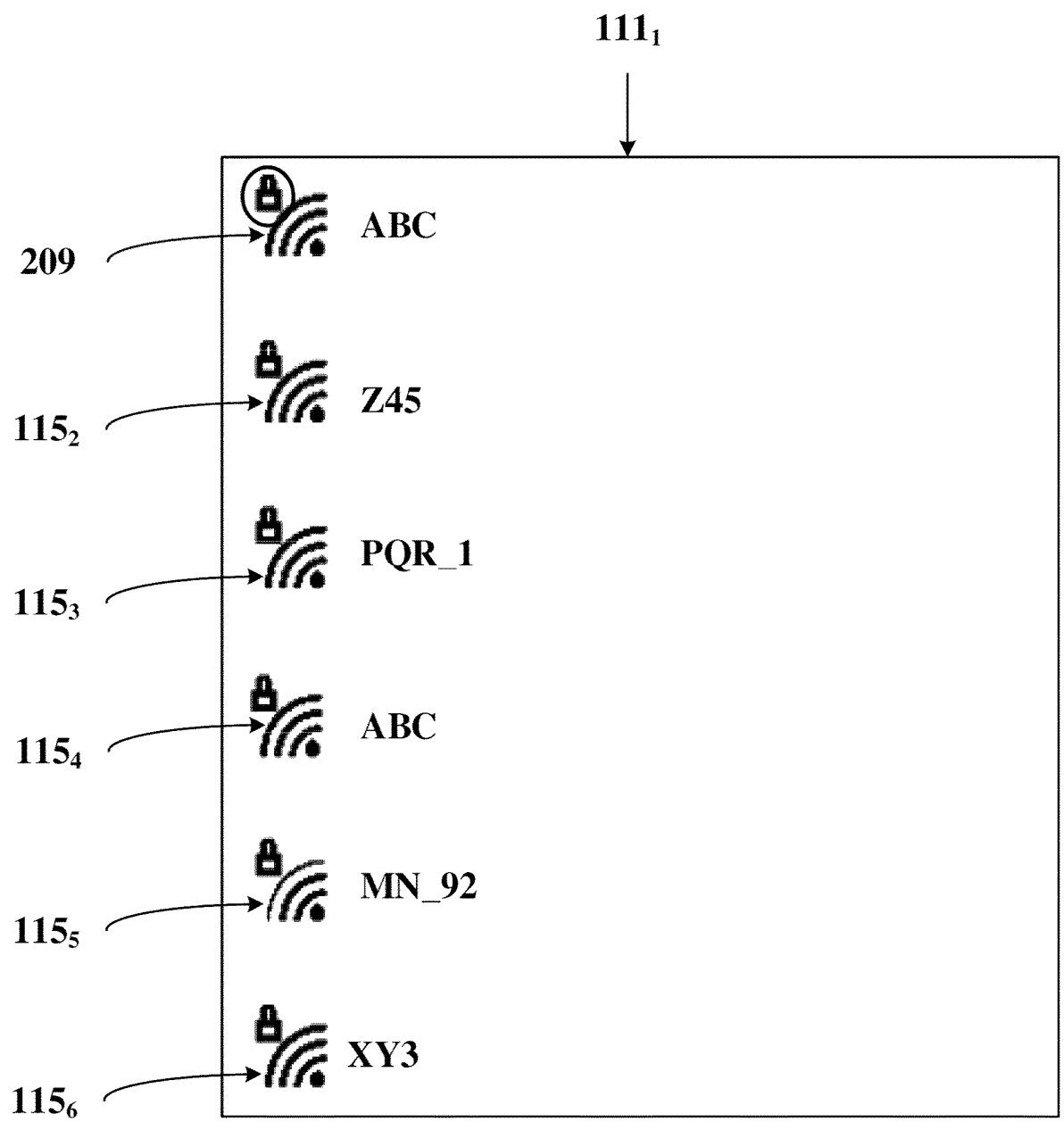
FIG. 2B shows an exemplary User Interface (UI) of a station device illustrating a closed visual icon indicating a closed Wi-Fi hotspot network in accordance with some embodiments of the present disclosure.

FIG. 2B shows an exemplary User Interface (UI) of a station device illustrating a closed visual icon indicating a closed Wi-Fi hotspot network in accordance with some embodiments of the present disclosure.

Figure 1B:
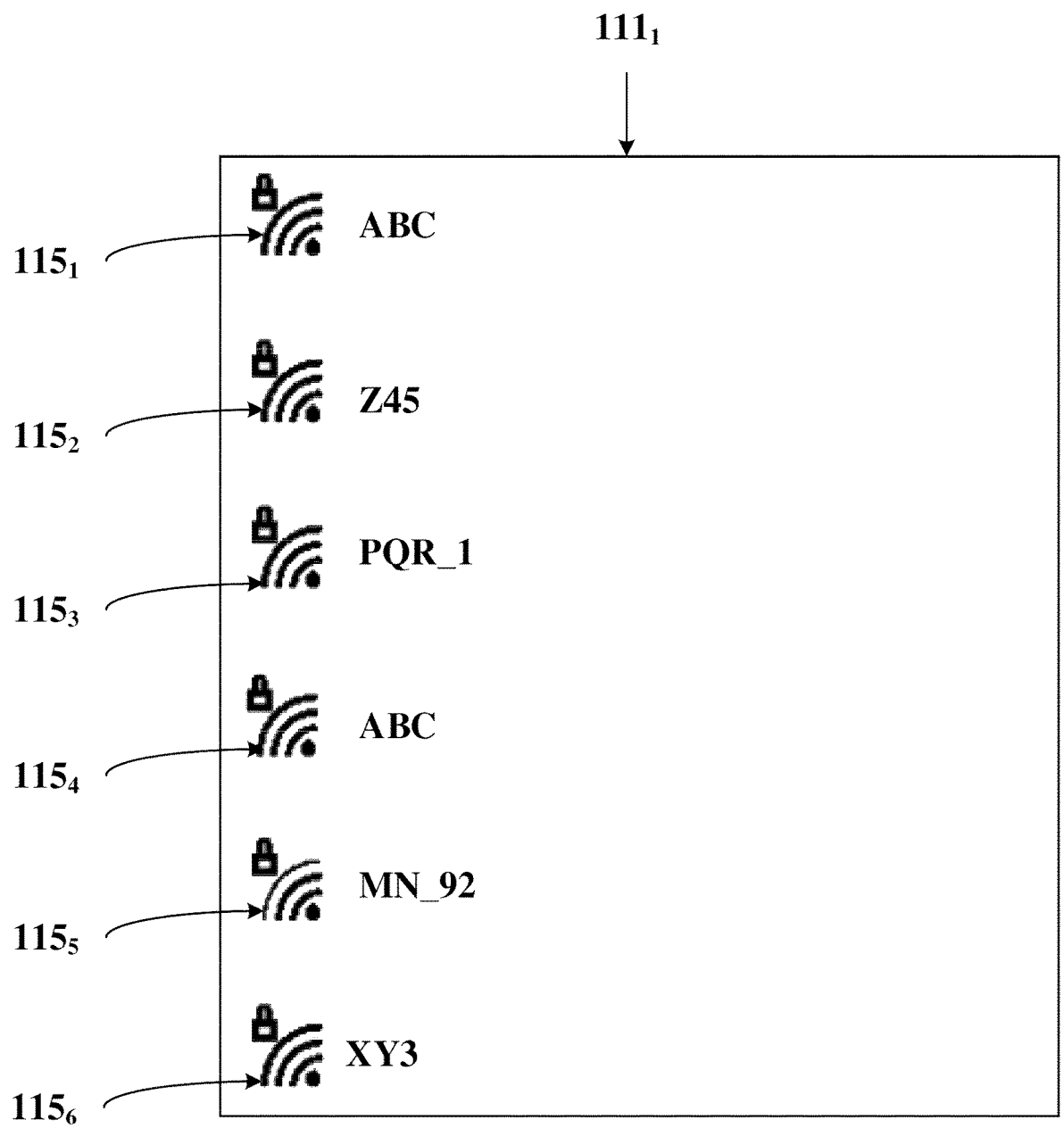
FIG. 1B shows an example of a User Interface (UI) of a conventional station device illustrating unsecured Wi-Fi hotspot network names and respective visual icons.

Comparing the FIG. 2B with FIG. 1B, it is observed that a closed visual icon 209 along with other visual icons $115_2$, $115_3$, $115_4$, $115_5$, $115_6$ may be displayed on the UI $111_1$ of the laptop $103_1$. The closed visual icon 209 may represent the closed Wi-Fi hotspot network 201 created by the legitimate AP device 101. Here, even if the intruder 105 creates a fraudulent AP device 107 having the same SSID 'ABC' and security types as that of the legitimate AP device 101, the closed Wi-Fi hotspot network 201 may be easily differentiated from the other Wi-Fi hotspot networks due to the closed visual icon 209, as illustrated in FIG. 2B.

Even when the intruder 105 generates the evil twin or the fraudulent AP device (not shown in figure) with the closed Wi-Fi hotspot network 201, the encryption key may be different from the encryption key 205 of the legitimate AP device 101. Based on this difference between the encryption keys, the station device may distinguish the intruder's fraudulent AP device from the legitimate AP device 101 in discovery phase.

Figure 3A:
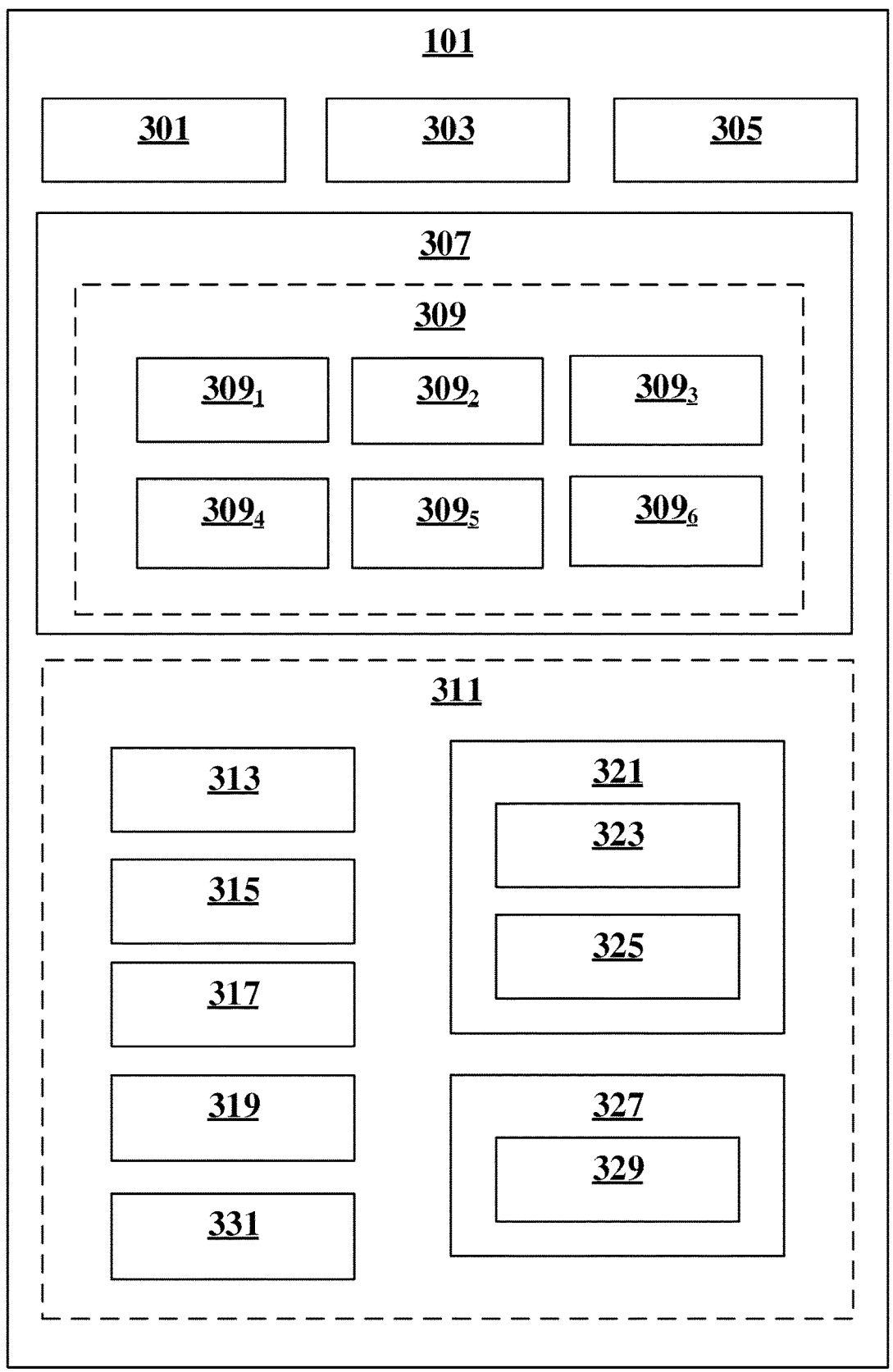
FIG. 3A shows a block diagram of an Access Point (AP) device in accordance with some embodiments of the present disclosure.

FIG. 3A shows a block diagram of an AP device in accordance with some embodiments of the present disclosure.

In some implementations, the AP device 101 may include an I/O Interface 301, a processor 303, at least one transceiver antenna 305, and a memory 307. Here, the I/O Interface 301 may be a hotspot interface (alternatively referred to as AP interface, or wireless LAN interface, swlan0), and may be communicatively coupled with the one or more station devices 103. Particularly, the I/O Interface 301 may be configured to receive one or more inputs from a user 203 associated with the AP device 101. The I/O Interface 301 may also be configured to transmit an encryption key 205 to one or more station devices 103, which are present within a predefined region associated with the AP device 101. The I/O Interface 301 may be configured to receive a connection request from at least one station device among the one or more station devices 103. Here, the I/O Interface 301 may be associated with the at least one transceiver antenna 305 for performing communication with the one or more station devices 103.

Further, the processor 303 may receive a first input for creating the closed Wi-Fi hotspot network 201 via the I/O Interface 301 from a user 203 associated with the AP device 101. The processor 303 may transmit an encryption key 205 to the one or more station devices 103 over an in-band communication medium or an out-of-band communication medium. Further, the processor 303 may create the closed Wi-Fi hotspot network 201 by communicating one or more management frames in cipher text 207 with the one or more station devices 103. Additionally, the processor 303 may receive the connection request from the at least one station device among the one or more station devices 103 for providing the internet access. Further, the processor 303 may provide the internet access to the at least one station device over the closed Wi-Fi hotspot network 201.

In the AP device 101, the memory 307 may store data 309 received through the I/O Interface 301, the processor 303, and the modules 311. In one embodiment, the data 309 may include distance data $309_1$, encryption key data $309_2$, station devices data $309_3$, management frame data $309_4$, authentication data $309_5$ and other data $309_6$. The distance data $309_1$ may include distances of the one or more station devices 103 from the AP device 101. The encryption key data $309_2$ may include encryption key 205 to be transmitted to the one or more station devices 103. The station devices data $309_3$ may include Medium Access Control (MAC) addresses of the one or more station devices 103. The management frame data $309_4$ may include data associated with the beacon frames, the probe frames, and the association frames. The authentication data $309_5$ may include data associated with 4-way handshake-based authentication. The other data $309_6$ may store data, including temporary data and temporary files generated by the processor 303, and the modules 311 for performing the various functions of the AP device 101.

In some embodiments, the data 309 stored in the memory 307 may be processed by the modules of the AP device 101. In an example, the modules 311 may be communicatively coupled to the processor 303 configured in the AP device 101. The modules 311 may be present outside the memory 307 as shown in FIG. 3A and implemented as separate hardware. As used herein, the term modules 311 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 311 may include, for example, a receiving module 313, a determination module 315, an extraction module 317, a random key generator 319, a key transmitting module 321, an in-band authentication module 323, an out-of-band authentication module 325, a network creation module 327, an encryption module 329, and other modules 331. The other modules 331 may be used to perform various miscellaneous functionalities of the AP device 101. It will be appreciated that aforementioned modules 311 may be represented as a single module or a combination of different modules. Furthermore, a person of ordinary skill in the art will appreciate that in an implementation, the one or more modules 311 may be stored in the memory 307, without limiting the scope of the disclosure. The said modules 311 when configured with the functionality defined in the present disclosure will result in a novel hardware.

In an embodiment, the receiving module 313 may receive a first input for creating the closed Wi-Fi hotspot network 201 from the user 203 through the I/O Interface 301. The receiving module 313 may trigger the extraction module 317 for further operations upon receiving the first input. Also, the receiving module 313 may receive a second input for changing a network identification from the user 203 through the I/O Interface 301. The receiving module 313 may trigger the random key generator 319 for further operations upon receiving the second input. Further, the receiving module 313 may receive the connection request from the at least one station device among the one or more station devices 103 through the I/O Interface 301. The receiving module 313 may send the connection request to the network creation module 327 for further processing.

In an embodiment, the determination module 315 may determine distance of each of the one or more station devices 103 utilizing, for example, a triangulation positioning method, a trilateration positioning method, or a ranging based localization method. Based on the determined distance, the determination module 315 may determine whether each of the one or more station devices 103 is present within the predefined region (also referred to as connect zone) associated with the AP device 101. The determination module 315 may send the information associated with the one or more station devices 103 present within the predefined region to the key transmitting module 321 for further processing.

In an embodiment, the extraction module 317 may extract the encryption key 205 stored in the memory 307 configured in the AP device 101 upon receiving the first input from the user 203. Particularly, the extraction module 317 may be triggered by the receiving module 313. Further, the extraction module 317 may extract the prestored encryption key 205 from the memory 307 and send to the key transmitting module 321 for further processing.

In an embodiment, the random key generator 319 may generate a random number upon receiving the second input for changing the network identification from the user 203. Particularly, the random key generator 319 may be triggered by the receiving module 313 upon receiving the second input. As an example, the second input may be associated with a change in a SSID. Further, the random key generator 319 may generate the random number, and may set the random number as the encryption key 205. Further, the random key generator 319 may store the generated random number in the memory 307 as the encryption key data $309_2$ for use by the extraction module 317.

In an embodiment, the key transmitting module 321 may transmit an encryption key 205 to one or more station devices 103 over an in-band communication medium or an out-of-band communication medium upon receiving the first input. Particularly, the key transmitting module 321 may receive the key from the extraction module 317. Also, the key transmitting module 321 may receive the information associated with the one or more station devices 103 present within the predefined region from the determination module 315. Thereafter, the key transmitting module 321 may transmit the encryption key 205 to the one or more station devices 103 over the in-band communication medium (herein referred to as in-band key sharing) or the out-of-band communication medium (herein referred to as out-of-band key sharing). Further, the key transmitting module 321 may send the encryption key 205 to the network creation module 327 for further processing.

Figure 3B:
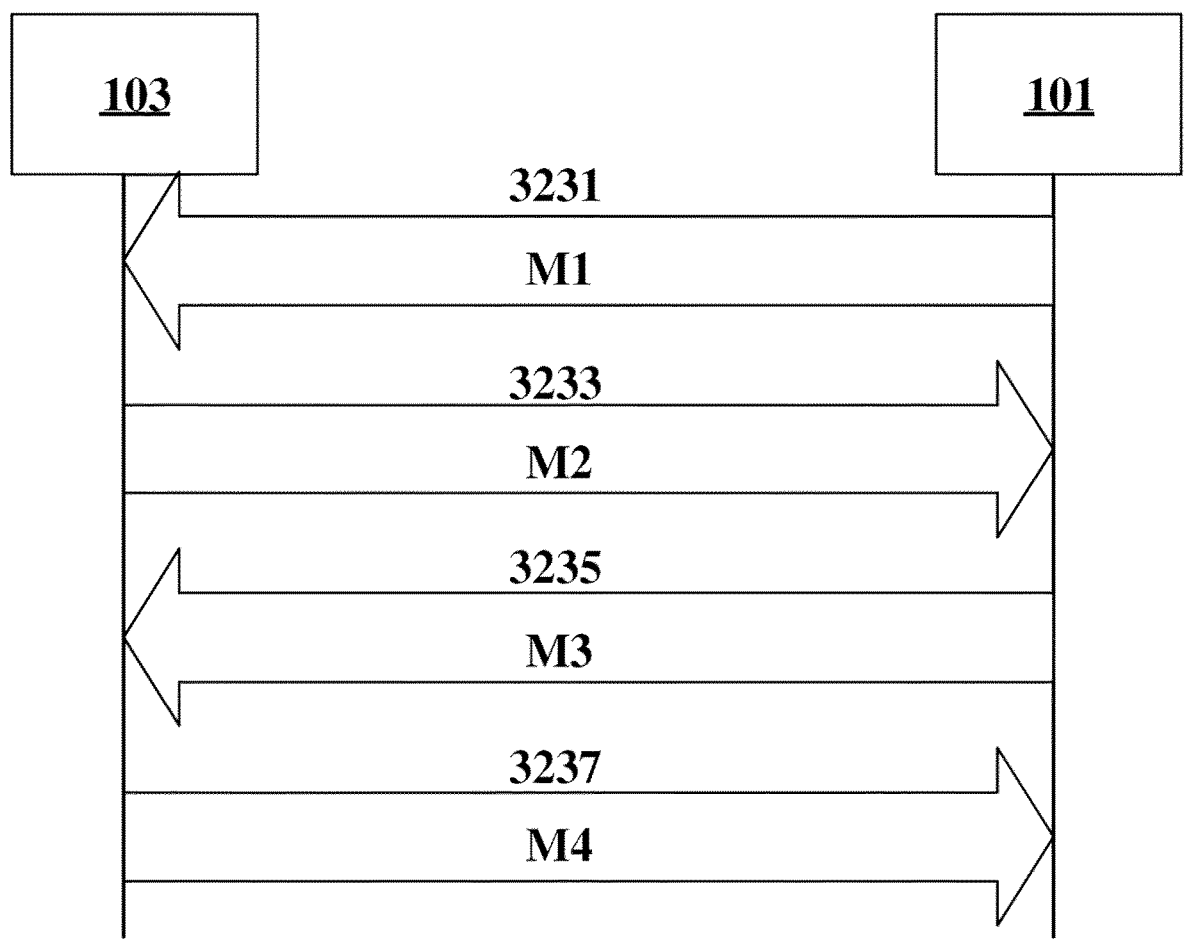
FIG. 3B shows a sequence flow diagram for transmitting an encryption key to a station device over an in-band communication medium in accordance with some embodiments of the present disclosure.

The key transmitting module 321 may comprise an in-band authentication module 323 and an out-of-band authentication module 325. The in-band authentication module 323 may transmit the encryption key 205 in one of a plurality of messages associated with 4-way handshake-based authentication to the one or more station devices 103 over a Wi-Fi network to perform the in-band key sharing. The in-band authentication module 323 may extract a pre-shared Pairwise Master Key (PMK) from the authentication data $309_5$ of the memory 307. Further, the in-band authentication module 323 may generate an ANonce, which is a random number. As illustrated in FIG. 3B, at 3231, the in-band authentication module 323 may transmit a first message (M1) comprising the ANonce to a station device 103 under authentication process, over the Wi-Fi network. Upon receiving the first message (M1), the station device 103 may generate a SNonce, which is a random number. The station device 103 may also extract the pre-shared PMK. Further, the station device 103 may generate a Pairwise Transient Key (PTK) by applying a pseudo-random function to the extracted PMK, the received Anonce, the generated SNonce, a MAC address of the station device 103 and a MAC address of the AP device 101. Further, the station device 103 may transmit the generated SNonce to the AP device 101.

Further, at 3233 illustrated in FIG. 3B, the in-band authentication module 323 may receive a second message (M2) comprising the SNonce and a Message Integrity Check (MIC) value from the station device 103 over the Wi-Fi network in response to transmitting the first message (M1). Based on the MIC, the in-band authentication module 323 may determine that the second message (M2) is not altered in transit. The MIC may prevent bit-flip attacks by the intruder. Upon receiving the SNonce, the in-band authentication module 323 may generate the PTK locally by applying the pseudo-random function to the extracted PMK, the generated Anonce, the received SNonce, the MAC address of the station device 103 and the MAC address of the AP device 101. The PTK may be utilized to encrypt all unicast traffic between the station device 103 and the AP device 101. The PTK may be unique between the station device 103 and the AP device 101. Further, the in-band authentication module 323 may extract a Group Master Key (GMK), and may generate a Group Transient Key (GTK) and an Integrity Group Transient Key (IGTK) based on the extracted GMK. The in-band authentication module 323 may also generate a Key Encryption Key (KEK). At 3235 illustrated in FIG. 3B, the in-band authentication module 323 may transmit a third message (M3) comprising the GTK, the IGTK, and the encryption key 205, encrypted with the KEK, to the station device 103 over the Wi-Fi network. Security during transmission of the third message (M3) may be ensured due to use of KEK for encryption. Upon receiving the third message (M3), the station device 103 may install the GTK, the IGTK, and the encryption key 205. At 3237 illustrated in FIG. 3B, the in-band authentication module 323 may receive a fourth message (M4) comprising an acknowledgement indicating successful installation of the GTK, IGTK and the encryption key 205 from the station device 103 over the Wi-Fi network.

Figure 3C:
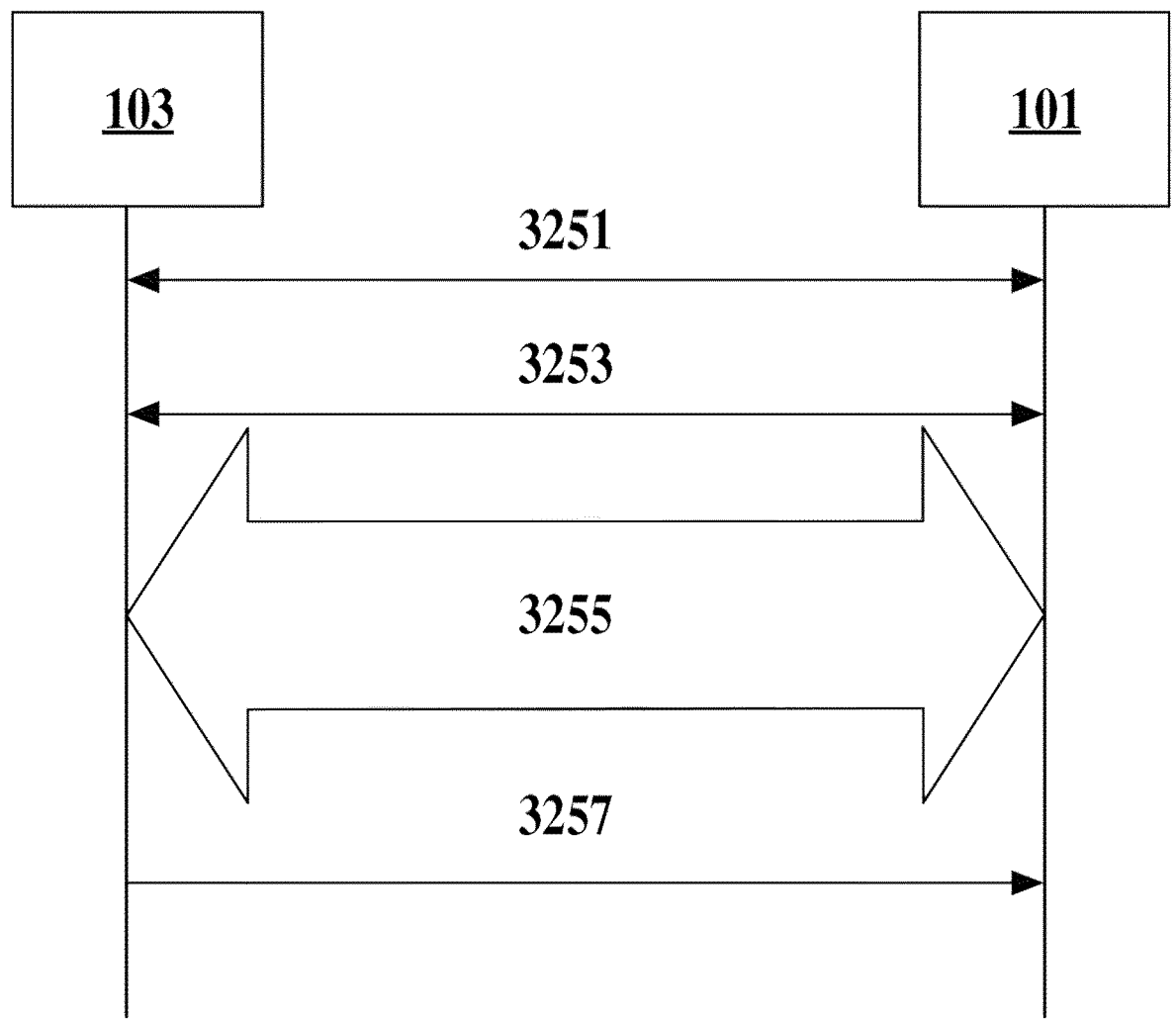
FIG. 3C shows a sequence flow diagram for transmitting an encryption key to a station device over an out-of-band communication medium in accordance with some embodiments of the present disclosure.

Further, the out-of-band authentication module 325 may perform the out-of-band key sharing as illustrated in FIG. 3C. At 3251, the out-of-band authentication module 325 may discover the station device 103 at a proximal distance of the AP device 101 utilizing, for example, a Bluetooth Low Energy (BLE) protocol or a Wi-Fi Aware protocol. At 3253, the out-of-band authentication module 325 may authenticate the station device 103 connected to the AP device 101 over a short-range wireless network or a cellular network. The short-range wireless network may include, but is not limited to, Bluetooth, and Wi-Fi. Further, the out-of-band authentication module 325 may establish a secure wireless channel with the authenticated station device 103. At 3255, the out-of-band authentication module 325 may transmit the encryption key 205 along with the SSID and security information to the authenticated station device 103 through the secure wireless channel. At 3257, the station device 103 may be connected to the closed Wi-Fi network utilizing the one or more management frames in the cipher text 207 and the encryption key 205 transmitted from the AP device 101.

In an embodiment, the network creation module 327 may create the closed Wi-Fi hotspot network 201 by communicating one or more management frames in cipher text 207 with the one or more station devices 103 upon transmitting the encryption key 205. Particularly, the network creation module 327 may receive the encryption key 205 from the key transmitting module 321. The network creation module 327 may comprise an encryption module 329. Upon receiving the encryption key 205, the encryption module 329 may encrypt one or more Information Elements (IEs) of the one or more management frames 207 utilizing the encryption key 205. Upon encrypting the one or more Information Elements (IEs), the network creation module 327 may transmit or broadcast the one or more management frames in the cipher text 207 instead of clear text through the at least one transceiver antenna 305.

Figure 3D:
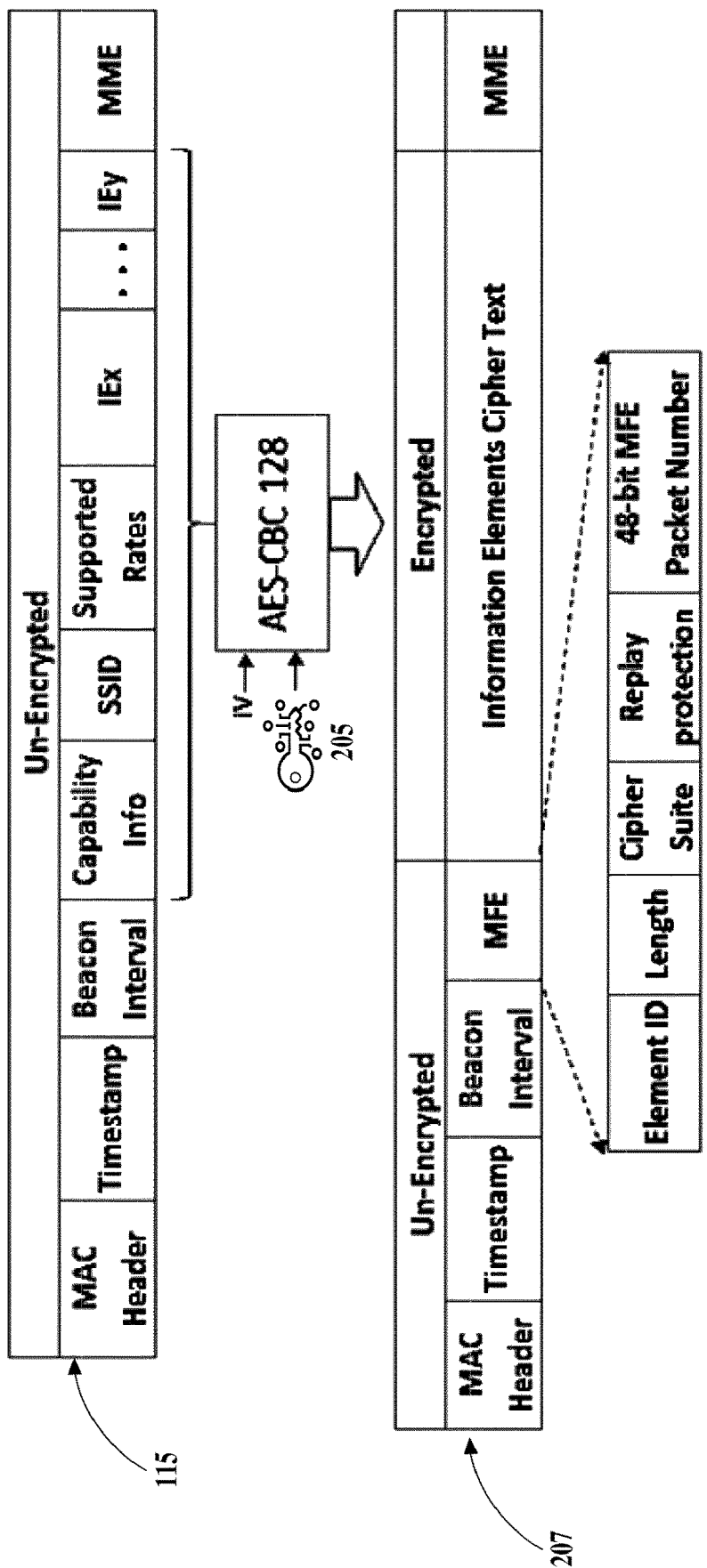
FIG. 3D shows an exemplary beacon frame in accordance with some embodiments of the present disclosure.

The one or more IEs may comprise capability information, Service Set Identifier (SSID) information, supported rate information, extended supported rate information, Robust Secure Network (RSN) information, and Basic Service Set (BSS) load information. As an example, the encryption module 329 may utilize a 128-bit Advanced Encryption Standard (AES) Cipher Block Chaining (CBC) mode symmetric cipher for performing encryption and decryption of the one or more management frames 207. Further, the network creation module 327 may create the one or more management frames in the cipher text 207 comprising a timestamp, a beacon interval, a Management Frame Element (MFE) IE, the one or more encrypted IEs and a Management MIC Element (MME), as illustrated in FIG. 3D. The timestamp, the beacon interval, MFE IE and the MME may remain unencrypted to reduce computational complexity. The MFE IE may comprise an element ID, length information, cipher suite information, replay protection information, and 48-bit MFE packet number, as illustrated in FIG. 3D. The MFE IE in the one or more management frames 207 may indicate support of encryption based closed Wi-Fi hotspot network 201 scheme, such that the one or more station devices 103 can prioritize the AP device 101 among a plurality of the AP devices for improved security upon receiving the one or more management frames in the cipher text 207.

Figure 3E:
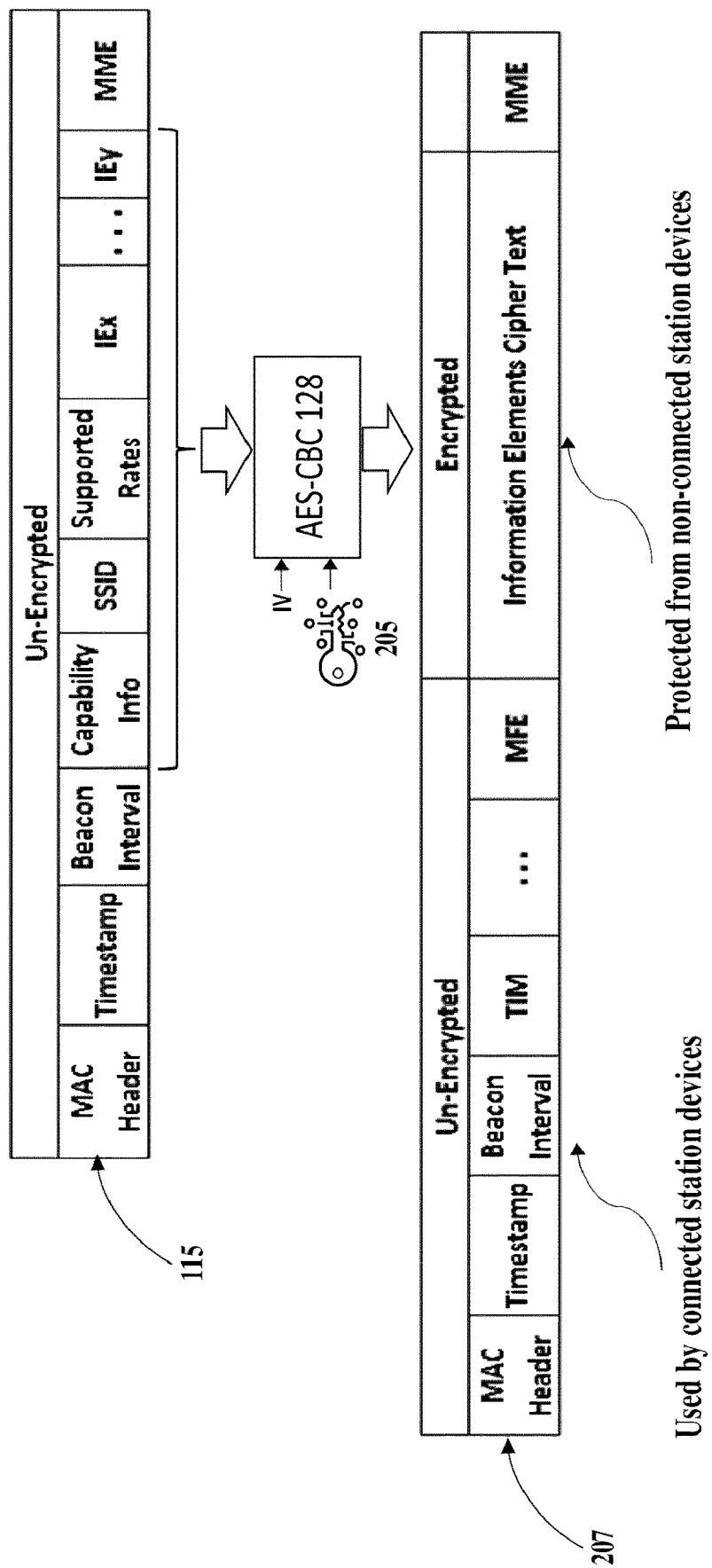
FIG. 3E shows an optimal management frame in accordance with some embodiments of the present disclosure.

In an alternative embodiment, the encryption module 329 may classify the one or more IEs into a plurality of first IEs and a plurality of second IEs, and may encrypt only the plurality of first IEs utilizing the encryption key 205. The plurality of first IEs may include one or more IEs required by a first type of station devices, which are in connecting phase or not connected to the closed Wi-Fi hotspot network 201. The plurality of second IEs may include one or more IEs required by a second type of station devices, which are already connected to the closed Wi-Fi hotspot network 201. Such selective encryption of the plurality of first IEs among the one or more IEs may reduce additional overhead. Particularly, connected station devices may process beacon frames at every predefined time, as an example ~102 ms. In such scenarios, encrypting all the management elements may create additional overhead. To reduce this, the encryption module 329 may selectively encrypt the plurality of first IEs utilizing the encryption key 205, and may keep the plurality of second IEs unencrypted as illustrated in FIG. 3E.

As an example, the plurality of first IEs may include, but not limited to, the capability information, the SSID, the supported rate information, the extended supported rate information, the RSN information, and the BSS load information. The capability information may include a plurality of subfields which indicate requested or advertised optional capabilities. The capability information may also include, but not limited to, the VHT capability information, the HE capability information and the EHT capability information which are used to set up operation of IEEE 802.11ac compliant networks, IEEE 802.11ax compliant networks, and IEEE 802.11be compliant networks, respectively.

The SSID may represent network name or network identification. The supported rate information may include data rate supported by the AP device 101. The extended supported rate information may include one or more supported rates not carried in the supported rate information. It may be only required if there are more than 8 supported rates. The RSN information may be used to indicate authentication cipher, encryption cipher and other RSN capability of stations. The BSS load information may be used only when Quality of Service (QoS) is supported. This may include station count, channel utilization, available admission capacity.

As an example, the plurality of second IEs may include, but not limited to, Traffic Indication Map (TIM), channel switch information, and quite information. The TIM may include information about buffered traffic for each of the one or more station devices 103. The channel switch information may be related to IEEE 802.11h. When a radar blast is detected, the one or more station devices 103 may leave an affected channel. The AP device 101 may announce a next channel to a cell, such that the connected station devices may move to the new channel. The quite information may be related to IEEE 802.11h, where the AP device 101 may request a quiet time during which transmission from the one or more station device may be forbidden to test the channel for presence of radars.

Figure 4:
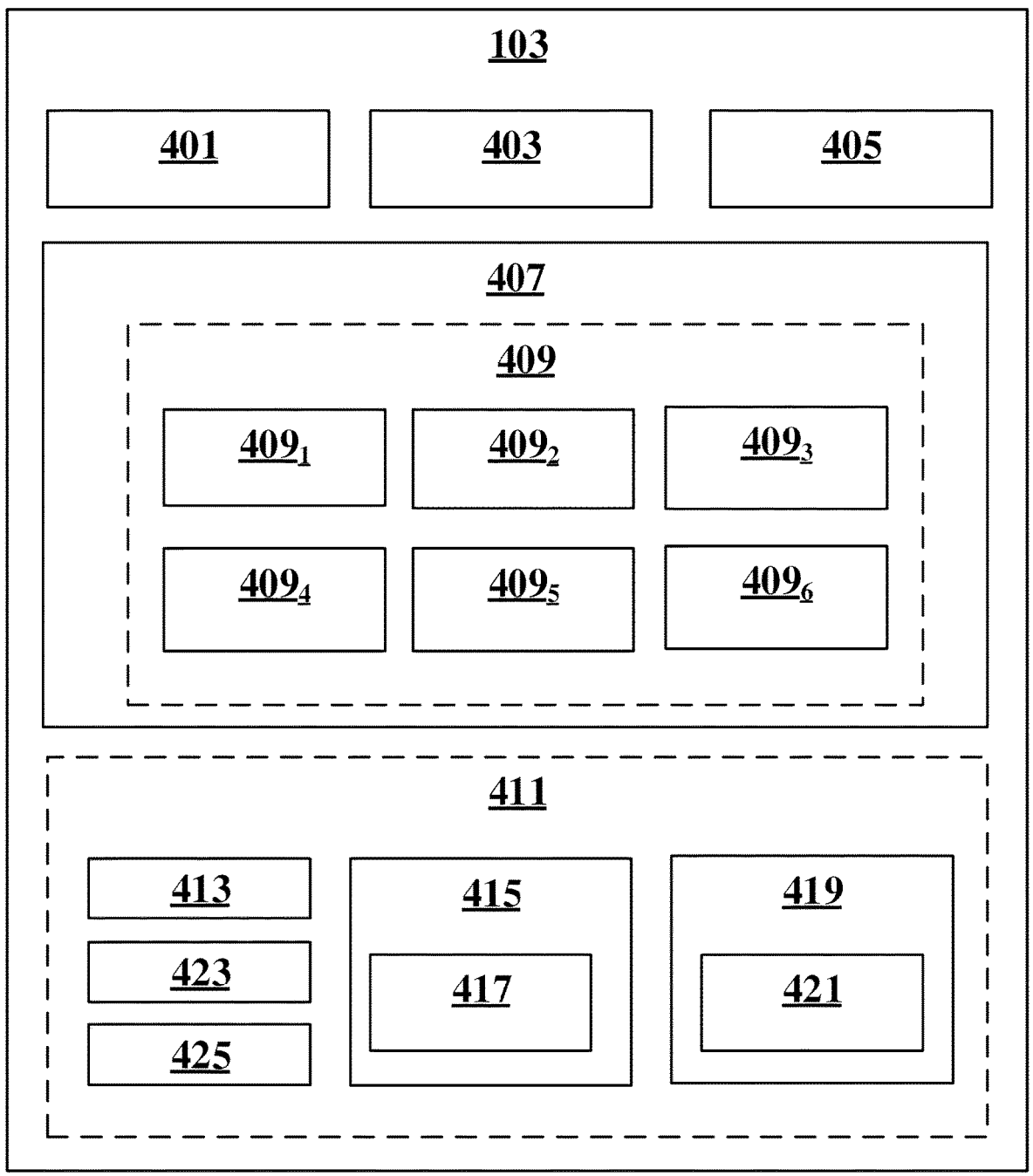
FIG. 4 shows a block diagram of a station device in accordance with some embodiments of the present disclosure.

FIG. 4 shows a block diagram of a station device in accordance with some embodiments of the present disclosure.

In some implementations, the station device may include an I/O Interface 401, a processor 403, at least one transceiver antenna 405, and a memory 407. Here, the I/O Interface 401 may be a Wi-Fi interface, and may be communicatively coupled with a plurality of AP devices. Here, the station device may represent one of the one or more station devices 103, illustrated in FIG. 2A. The I/O Interface 401 may be configured to receive a plurality of beacon frames from the plurality of AP devices. Here, each of the plurality of AP devices may have a predefined region (alternatively referred to as connect zone or hotspot range), within which the station device may be present. Further, the I/O Interface 401 may be configured to receive an encryption key 205, and one or more management frames in cipher text 207 from the AP device 101 among the plurality of AP devices. Further, the I/O Interface 401 may be configured to transmit a connection request to the AP device 101 among the plurality of AP devices. Here, the I/O Interface 401 may be associated with the at least one transceiver antenna 405 for performing communication with the AP device 101 among the plurality of AP devices.

In the station device, the processor 403 may receive the plurality of beacon frames from the plurality of AP devices. The processor 403 may also receive the encryption key 205 and the one or more management frames in cipher text 207 from the AP device 101 among the plurality of AP devices through the at least one transceiver antenna 405. Further, the processor 403 may prioritize the AP device 101 among the plurality of AP devices upon receiving the encryption key 205 and the one or more management frames in the cipher text 207. The processor 403 may generate and transmit a connection request to the prioritized AP device 101 for connecting to the closed Wi-Fi hotspot network 201. To perform the aforesaid method and functions, the processor 403 may utilize various modules 411 and memory 407 of the station device.

In the station device, the memory 407 may store data 409 received through the I/O Interface 401, the processor 403, and the modules 411. In one embodiment, the data 409 may include encryption key data $409_1$, AP devices data $409_2$, management frame data $409_3$, authentication data $409_4$, decryption data $409_5$, and other data $409_6$. The encryption key data $409_1$ may include received encryption key 205 from the AP device 101. The AP devices data $409_2$ may include a plurality of Medium Access Control (MAC) addresses of the plurality of the AP devices. The management frame data $409_3$ may include the plurality of beacon frames received from the plurality of the AP devices, probe response frame, association response frame received from the AP device 101. The authentication data $409_4$ may include data received from the AP device 101 during 4-way handshake-based authentication. The decryption data $409_5$ may include data retrieved from the one or more management frames 207, which are in cipher text, by performing decryption utilizing the encryption key 205. The other data $409_6$ may store data, including temporary data and temporary files generated by the processor 403, and modules 411 for performing the various functions of the station device.

In some embodiments, the data 409 stored in the memory 407 may be processed by the modules 411 of the station device. In an example, the modules 411 may be communicatively coupled to the processor 403 configured in the station device. The modules 411 may be present outside the memory 407 as shown in FIG. 4 and implemented as separate hardware. As used herein, the term modules 411 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 411 may include, for example, a receiving module 413, an extraction module 415, a request generation module 419, a transmitting module 423 and other modules 425. The other modules 425 may be used to perform various miscellaneous functionalities of the station device. It will be appreciated that aforementioned modules 411 may be represented as a single module or a combination of different modules. Furthermore, a person of ordinary skill in the art will appreciate that in an implementation, the one or more modules 411 may be stored in the memory 407, without limiting the scope of the disclosure. The said modules 411 when configured with the functionality defined in the present disclosure will result in a novel hardware.

In an embodiment, the receiving module 413 may receive the encryption key 205 and the one or more management frames 207 from the AP device 101 among the plurality of AP devices through the I/O Interface 401. The receiving module 413 may receive the encryption key 205 over an in-band communication medium or an out-of-band communication medium from the AP device 101. Further, the receiving module 413 may receive the one or more management frames in cipher text 207 from the AP device 101. The one or more management frames 207 may be, but not limited to, a beacon frame, a probe frame or an association frame. Further, the probe frame and the association frame may include a probe response and an association response, respectively. Further, the receiving module 413 may send the encryption key 205 and the one or more management frames 207 to the extraction module 415 for further processing. Additionally, the receiving module 413 may receive the plurality of beacon frames, which are in clear text, from the plurality of AP devices other than the AP device 101. The receiving module 413 may also send the plurality of beacon frames to the request generation module 419 for further processing.

In an embodiment, the extraction module 415 may extract connection information of the AP device 101 from the one or more management frames in the cipher text 207. The extraction module 415 may comprise a decryption module 417. Particularly, the extraction module 415 may receive the encryption key 205 and the one or more management frames in the cipher text 207 from the receiving module 413. Thereafter, the decryption module 417 may decrypt one or more encrypted IEs of the received one or more management frames 207 using the received encryption key 205. Upon decryption, the extraction module 415 may extract the connection information of the AP device 101 from the decrypted one or more IEs. The extraction module 415 may send the extracted connection information to the request generation module 419 for further processing.

In an embodiment, the request generation module 419 may generate the connection request based on the extracted connection information of the AP device 101 and a Medium Access Control (MAC) address of the station device. The request generation module 419 may comprise a prioritization module 421. The prioritization module 421 may prioritize the AP device 101 among the plurality of AP devices for connecting to the closed Wi-Fi hotspot network 201. The prioritization module 421 may prioritize the AP device 101 based on the encryption key 205 and extracted connection information of the AP device 101. Thereafter, the request generation module 419 may generate the connection request utilizing the extracted connection information, for example, the SSID, the supported rate information and capability information of the prioritized AP device 101. As an example, the connection request may be an association request for associating with the prioritized AP device 101. Further, the request generation module 419 may send the connection request to the transmitting module 423 for further processing.

In an embodiment, the transmitting module 423 may transmit the generated connection request to the AP device 101. The transmitting module 423 may receive the connection request from the request generation module 419. Further, the transmitting module 423 may transmit the connection request to the prioritized AP device 101 for connecting to the closed Wi-Fi hotspot network 201 utilizing the transceiver antenna 405.

Figure 5:
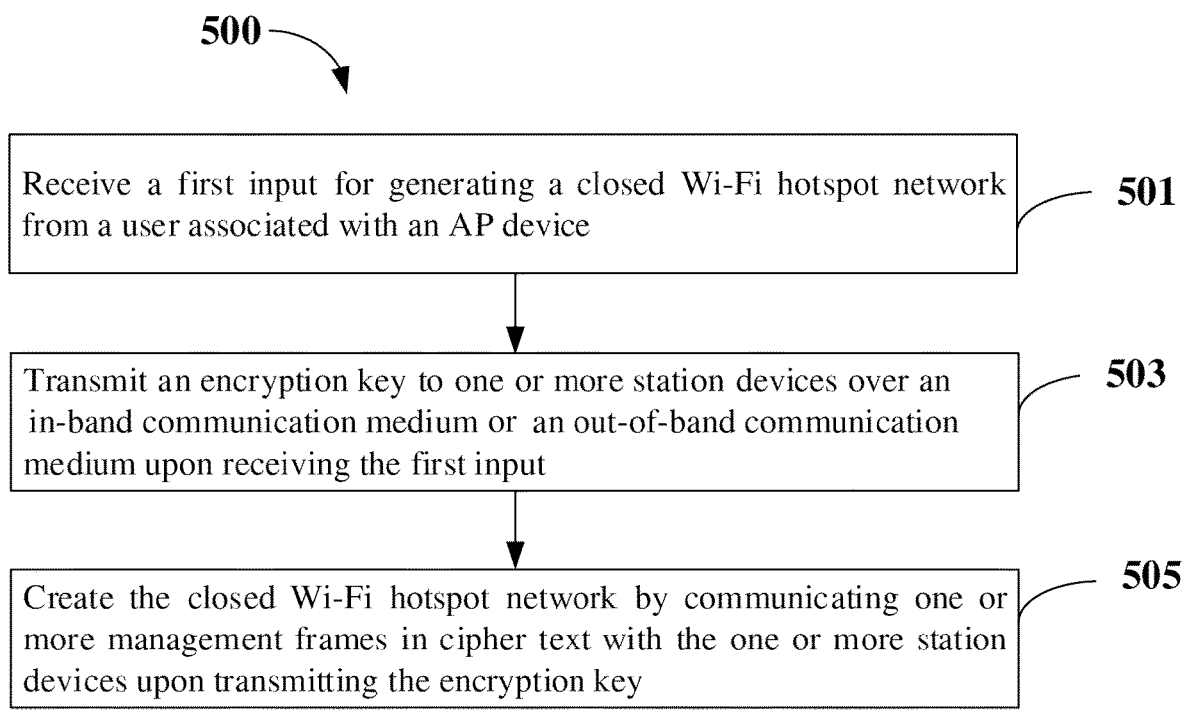
FIG. 5 shows a flow chart illustrating a method for creating a closed Wi-Fi hotspot network in accordance with some embodiments of the present disclosure.

FIG. 5 shows a flow chart illustrating a method for creating a closed Wi-Fi hotspot network in accordance with some embodiments of the present disclosure.

As illustrated in FIG. 5, the method 500 includes one or more blocks illustrating a method for creating a closed Wi-Fi hotspot network 201. The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the method may include receiving, by an AP device 101, a first input for creating the closed Wi-Fi hotspot network 201 from a user 203 associated with the AP device 101. Upon receiving the first input from the user 203, an encryption key 205 stored in a memory configured in the AP device 101 may be extracted. In case a second input for changing a network identification is received from the user 203, a random number may be generated utilizing a random key generator. The generated random number may be set as the encryption key 205.

At block 503, the method may include transmitting, by the AP device 101, an encryption key 205 to one or more station devices 103 over an in-band communication medium (also referred to as in-band key sharing) or an out-of-band communication medium (also referred to as out-of-band key sharing) upon receiving the first input. The one or more station devices 103 may be present within a predefined region associated with the AP device 101. Particularly, distance of each of the one or more station devices 103 may be determined utilizing, for example a triangulation positioning method, a trilateration positioning method or a ranging based localization method. Based on the determined distance whether each of the one or more station devices 103 is present within the predefined region associated with the AP device 101 may be determined.

To perform the in-band key sharing, the encryption key 205 may be transmitted in one of a plurality of messages associated with 4-way handshake-based authentication to the one or more station devices 103 over a Wi-Fi network. Particularly, a first message comprising an ANonce may be transmitted from the AP device 101 to each of the one or more station devices 103 over the Wi-Fi network. In response to transmitting the first message, a second message comprising a SNonce may be received at the AP device 101 from the one or more station devices 103 over the Wi-Fi network. Further, a third message comprising a Group Transient Key (GTK), an Integrity Group Transient Key (IGTK), and the encryption key 205 may be transmitted from the AP device 101 to the one or more station devices 103 over the Wi-Fi network. Here, each of the GTK, the IGTK, and the encryption key 205 may be encrypted with a Key Encryption Key (KEK) generated from a Pairwise Transient Key (PTK). The PTK may be generated by the AP device 101 by applying a pseudo-random function to a prestored Pairwise Master Key (PMK), the ANonce, the SNonce, a Medium Access Control (MAC) address of the AP device 101, and a Medium Access Control (MAC) address of each of the one or more station devices 103. Thereafter, in response to transmitting the third message, a fourth message comprising an acknowledgement indicating successful installation of the GTK, IGTK and the encryption key 205 may be received at the AP device 101 from the one or more station devices 103 over the Wi-Fi network.

To perform the out-of-band key sharing, the one or more station devices 103 connected to the AP device 101 may be authenticated over one of, a short-range wireless network and a cellular network. Further, a secure wireless channel may be established with each of the authenticated one or more station devices 103. Thereafter, the encryption key 205 may be transmitted to each of the authenticated one or more station devices 103 through the secure wireless channel.

At block 505, the method may include creating, by the AP device 101, the closed Wi-Fi hotspot network 201 by communicating one or more management frames in cipher text 207 with the one or more station devices 103 upon transmitting the encryption key 205. Each of the one or more management frames 207 may be one of a beacon frame, a probe frame and an association frame. Particularly, one or more Information Elements (IEs) of the one or more management frames 207 may be encrypted utilizing the encryption key 205. The one or more IEs may comprise capability information, Service Set Identifier (SSID) information, supported rate information, extended supported rate information, Robust Secure Network (RSN) information, Basic Service Set (BSS) load information, and Very High Throughput (VHT) capabilities information. Upon encrypting, the one or more management frames 207 may be transmitted or broadcasted to the one or more station devices 103. Each of the one or more management frames 207 may comprise a Management Frame Encryption (MFE) IE and the one or more encrypted IEs.

In response to transmitting or broadcasting the one or more management frames 207, a connection request may be received by the AP device 101 from at least one station device among the one or more station devices 103. The at least one station device may generate the connection request by decrypting the one or more encrypted IEs of the one or more management frames 207 utilizing the encryption key 205. Based on the received connection request from the at least one station device, the closed Wi-Fi hotspot network 201 may be created. Further, an internet access may be provided to the at least one station device over the closed Wi-Fi hotspot network 201. Here, the AP device 101 may be connected to a gateway device or a cellular base station for providing the internet access.

Figure 6:
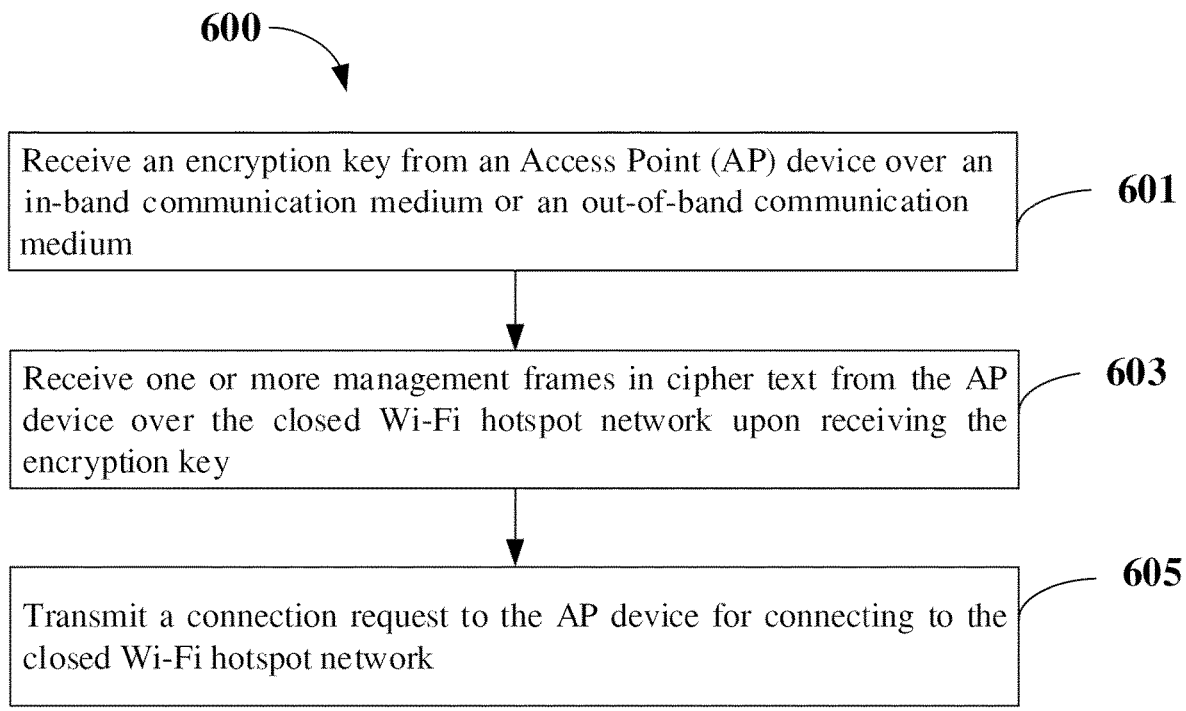
FIG. 6 shows a flow chart illustrating a method for connecting to a closed Wi-Fi hotspot network in accordance with some embodiments of the present disclosure.

FIG. 6 shows a flow chart illustrating a method for connecting to a closed Wi-Fi hotspot network in accordance with some embodiments of the present disclosure.

As illustrated in FIG. 6, the method 600 includes one or more blocks illustrating a method for connecting to a closed Wi-Fi hotspot network 201. The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 601, the method may include receiving, by a station device, an encryption key 205 from an Access Point (AP) device over an in-band communication medium or an out-of-band communication medium. The station device may be present within a predefined region associated with the AP device 101.

At block 603, the method may include receiving, by the station device, one or more management frames in cipher text 207 from the AP device 101 over the closed Wi-Fi hotspot network 201 upon receiving the encryption key 205.

At block 605, the method may include transmitting, by the station device, a connection request to the AP device 101 for connecting to the closed Wi-Fi hotspot network 201. Particularly, connection information of the AP device 101 may be extracted by decrypting one or more encrypted IEs of the received one or more management frames 207 using the received encryption key 205. Further, the connection request may be generated based on the extracted connection information and a MAC address of the station device. The generated connection request may be transmitted to the AP device 101.

Computing Device

Figure 7:
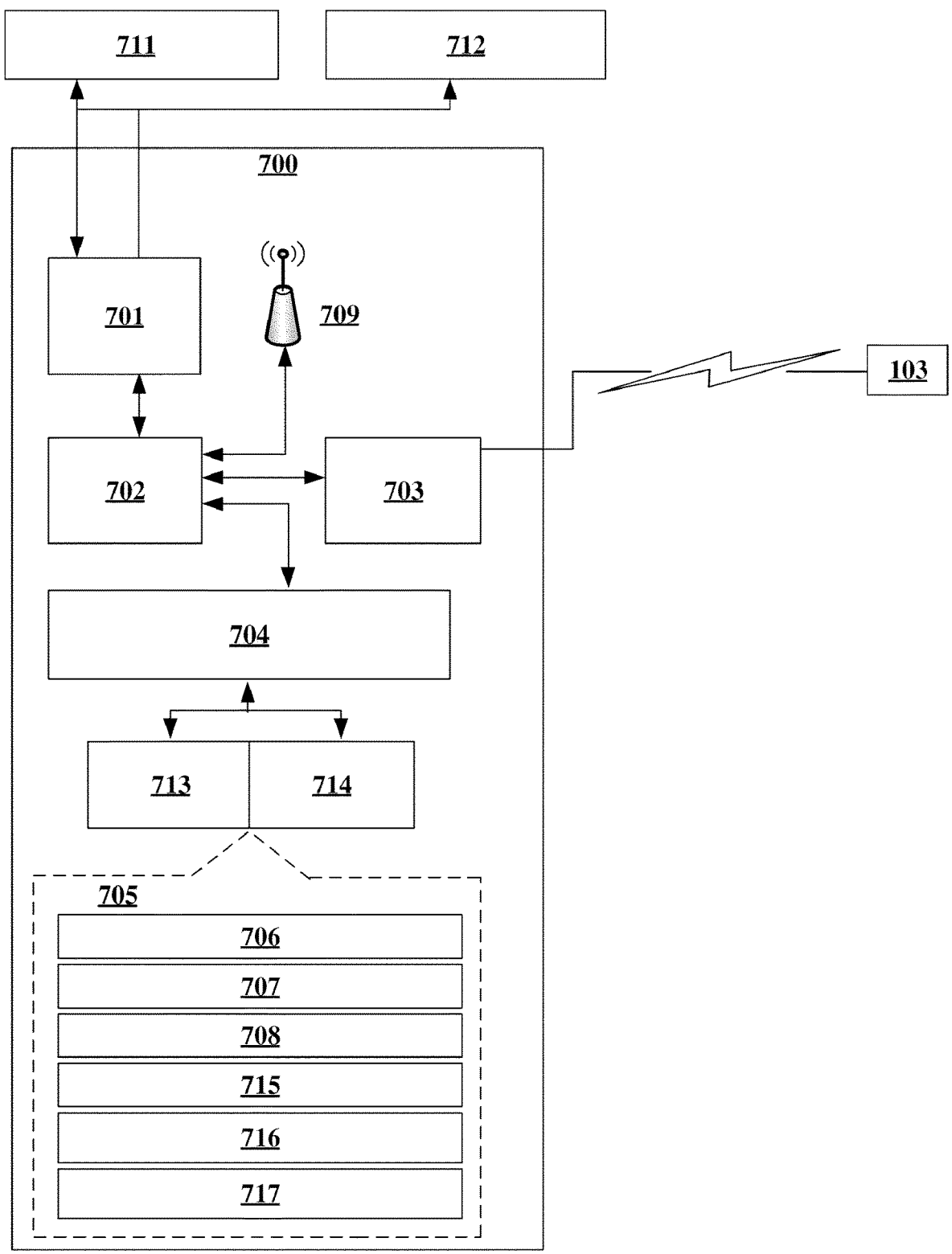
FIG. 7 shows a block diagram of an exemplary computing device for implementing embodiments consistent with the present disclosure.

FIG. 7 illustrates a block diagram of an exemplary computing device 700 for implementing embodiments consistent with the present disclosure. In an embodiment, the computing device 700 may be an AP device for creating a closed Wi-Fi hotspot network. The computing device 700 may include a central processing unit ("CPU" or "processor") 702. The processor 702 may comprise at least one data processor for executing program components for executing user or system-generated business processes. The processor 702 may include specialized processing units such as integrated system (bus) controllers, memory management control units, floating point units, graphics processing units, digital signal processing units, etc.

The processor 702 may be disposed in communication with one or more input/output (I/O) devices (711 and 712) via I/O interface 701. The I/O interface 701 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 701, the computing device 700 may communicate with one or more I/O devices 711 and 712.

In some embodiments, the processor 702 may be disposed in communication with a wireless communication network via a network interface 703. The network interface 703 may communicate with the wireless communication network. The network interface 703 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The wireless communication network can be implemented as one of the several types of networks, such as intranet or Local Area Network (LAN) and such within the organization. The wireless communication network may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network may include a variety of network devices, including routers, bridges, servers, computing devices, storage devices, etc.

In some embodiments, the processor 702 may be disposed in communication with a memory 705 (e.g., RAM 713, ROM 714, etc. as shown in FIG. 7) via a storage interface 704. The storage interface 704 may connect to memory 705 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user/application 706, an operating system 707, a web browser 708, mail client 715, mail server 716, web server 717 and the like. In some embodiments, computing device 700 may store user/application data 706, such as the data, variables, records, etc. as described in this disclosure. Such databases may be implemented as fault-tolerant, relational, scalable, secure databases such as Oracle® or Sybase®.

The operating system 707 may facilitate resource management and operation of the computing device 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computing device 700, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, an Access Point (AP) device for creating a closed Wireless Fidelity (Wi-Fi) hotspot network may comprises a processor 303, and a memory 307 communicatively coupled to the processor 303, wherein the memory 307 stores processor-executable instructions, which, on execution, causes the processor 303 to receive a first input for creating the closed Wi-Fi hotspot network 201, to transmit an encryption key 205 to one or more station devices 103 over an in-band communication medium or an out-of-band communication medium in response to receiving the first input, wherein the one or more station devices 103 are present within a predefined region associated with the AP device 101, and to create the closed Wi-Fi hotspot network 201 by communicating one or more management frames in cipher text 207 with the one or more station devices 103.

In an embodiment, the processor 303 may extract the encryption key 205 from the memory 307 in response to receiving the first input.

In an embodiment, the processor 303 may generate a random number utilizing a random key generator 319 in response to receiving a second input for changing a network identification, wherein the generated random number is set as the encryption key 205.

In an embodiment, the processor 303 may be configured to transmit the encryption key 205 in one of a plurality of messages associated with 4-way handshake-based authentication to the one or more station devices 103 over a Wi-Fi network.

In an embodiment, the processor 303 may be configured to transmit a first message comprising an ANonce to each of the one or more station devices 103 over the Wi-Fi network, to receive a second message comprising a SNonce and a Message Integrity Check (MIC) value from each of the one or more station devices 103 over the Wi-Fi network in response to transmitting the first message, to transmit a third message comprising a Group Transient Key (GTK), an Integrity Group Transient Key (IGTK), and the encryption key 205 to each of the one or more station devices 103 over Wi-Fi network, wherein each of the GTK, the IGTK, and the encryption key 205 is encrypted with a Key Encryption Key (KEK) generated from a Pairwise Transient Key (PTK), and to receive a fourth message comprising an acknowledgement indicating successful installation of the GTK, the IGTK and the encryption key 205 from each of the one or more station devices 103 over the Wi-Fi network.

In an embodiment, the processor 303 may be configured to generate the PTK by applying a pseudo-random function to at least one selected from the group of a prestored Pairwise Master Key (PMK), the ANonce, the SNonce, a Medium Access Control (MAC) address of the AP device 101, Medium Access Control (MAC) address of each of the one or more station devices 103, and combinations thereof.

In an embodiment, the processor 303 may be configured to authenticate the one or more station devices 103 connected to the AP device 101 over a short-range wireless network or a cellular network, to establish a secure wireless channel with each of the authenticated one or more station devices 103, and to transmit the encryption key 205 to each of the authenticated one or more station devices 103 through the secure wireless channel.

In an embodiment, the processor 303 may be configured to determine distance of each of the one or more station devices 103, and to determine whether each of the one or more station devices 103 is present within the predefined region associated with the AP device 101 based on the determined distance.

In an embodiment, the processor 303 may be configured to encrypt one or more Information Elements (IEs) of the one or more management frames 207 utilizing the encryption key 205, and to broadcast the one or more management frames 207 to the one or more station devices 103, wherein each of the one or more management frames 207 comprises a Management Frame Encryption (MFE) IE and the one or more encrypted IEs.

In an embodiment, the processor 303 may be configured to receive a connection request from at least one station device among the one or more station devices 103 in response to the broadcasted one or more management frames 207, wherein the at least one station device generates the connection request by decrypting the one or more encrypted IEs of the one or more management frames 207 utilizing the encryption key 205.

In an embodiment, the processor 303 may be configured to create the closed Wi-Fi hotspot network 201 based on the received connection request from the at least one station device.

In an embodiment, the processor 303 may be configured to provide an internet access to the at least one station device over the closed Wi-Fi hotspot network 201, wherein the AP device 101 is connected to a gateway device or a cellular base station for providing the internet access.

In an embodiment, the one or more management frames 207 may be a beacon frame, a probe frame or an association frame.

In an embodiment, the one or more IEs may comprise capability information, Service Set Identifier (SSID) information, supported rate information, extended supported rate information, Robust Secure Network (RSN) information, Basic Service Set (BSS) load information, and Very High Throughput (VHT) capabilities information.

In an embodiment, a station device 103 for connecting to a closed Wireless Fidelity (Wi-Fi) hotspot network may comprise a processor 403, and a memory 407 communicatively coupled to the processor 403, wherein the memory 407 stores processor-executable instructions, which, on execution, causes the processor 403 to receive an encryption key 205 from an Access Point (AP) device over an in-band communication medium or an out-of-band communication medium, wherein the station device 103 is present within a predefined region associated with the AP device 101, to receive one or more management frames 207 from the AP device 101 over the closed Wi-Fi hotspot network 201 upon receiving the encryption key 205, and to transmit a connection request to the AP device 101 for connecting to the closed Wi-Fi hotspot network 201 in response to receiving the one or more management frames.

In an embodiment, the processor 403 may be configured to extract connection information of the AP device 101 by decrypting one or more encrypted IEs of the received one or more management frames 207 using the received encryption key 205, to generate the connection request based on the extracted connection information and a Medium Access Control (MAC) address of the station device 103, and to transmit the generated connection request to the AP device 101.

Advantages of the Embodiment of the Present Disclosure are Illustrated Herein

In an embodiment, the present disclosure provides a method, and an Access Point (AP) device for creating a closed Wireless Fidelity (Wi-Fi) hotspot network.

In an embodiment, the present disclosure provides secure transmission of encryption key to one or more station devices over an in-band communication medium or an out-of-band communication medium. This prevents an intruder, which is not authorized or registered by the AP device, from obtaining the encryption key.

In an embodiment, the present disclosure enables communication of one or more management frames in cipher text with the one or more station devices, instead of clear text.

In an embodiment, the present disclosure improves security against one or more attacks associated with Wi-Fi hotspot networks such as brute-force attack, Denial-of-Service (DoS) attack, and evil twin attack by intruders. Encryption of connection information of the AP device in the one or more management frames and lack of the encryption key prevents the intruders from performing eavesdropping and subsequent one or more attacks associated with the Wi-Fi hotspot networks.

In an embodiment, the present disclosure reduces management frame overhead.

In an embodiment, the present disclosure provides a method for differentiating a fraudulent AP device from a legitimate AP device based on the encryption key to avoid security attacks.

In an embodiment, the present disclosure a method and a station device for connecting to a closed Wi-Fi hotspot network.

In an embodiment, the present disclosure provides a method for prioritizing an AP device, which transmits an encryption key and one or more management frames in cipher text, among a plurality of AP devices for improved security.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A phrase "at least one of" preceding as a series of items, with terms "and" or "or" to separate any of the items, allows a meaning that includes at least one of any one of the items, and/or at least one of any combination of the items, and/or at least one of each of the items. For example, each of the phrases "at least one of A, B, C and C" or "at least one of A, B, or C" refers to only A, only B, or only C; any combination of A, B, C; and/or at least one of each of A, B, and C.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for creating a closed Wi-Fi hotspot network, the method comprising:
   receiving, by an Access Point (AP) device, a first input for creating the closed Wi-Fi hotspot network;
   transmitting, by the AP device, an encryption key to one or more station devices over an in-band communication medium or an out-of-band communication medium in response to receiving the first input, wherein the one or more station devices are present within a predefined region associated with the AP device ;
   transmitting, by the AP device, one or more management frames including cipher text to the one or more station devices over the closed Wi-Fi hotspot network;
   receiving, by the AP device, a connection request from a station device for connecting to the closed Wi-Fi hotspot network, wherein the connection request is generated based on connection information of the AP device and a Medium Access Control (MAC) address of the station device, wherein the connection information of the AP device is extracted from one or more encrypted information elements of the one or more management frames using the encryption key; and
   creating, by the AP device, the closed Wi-Fi hotspot network.

2. The method as claimed in claim 1, further comprises:
   extracting, by the AP device, the encryption key stored in a memory configured in the AP device in response to receiving the first input.

3. The method as claimed in claim 1, further comprise:
   generating, by the AP device, a random number utilizing a random key generator in response to receiving a second input for changing a network identification, wherein the generated random number is set as the encryption key.

4. The method as claimed in claim 1, wherein transmitting, by the AP device, the encryption key to the one or more station devices over the in-band communication medium comprises:
   transmitting the encryption key in one of a plurality of messages associated with handshake-based authentication to the one or more station devices over a Wi-Fi network.

5. The method as claimed in claim 4, wherein transmitting the encryption key in one of a plurality of messages associated with the handshake-based authentication comprises:
   transmitting, by the AP device, a first message comprising an ANonce to the one or more station devices over the Wi-Fi network;
   receiving, by the AP device, a second message comprising a SNonce and a Message Integrity Check (MIC) value from the one or more station devices over the Wi-Fi network in response to transmitting the first message;
   transmitting, by the AP device, a third message comprising a Group Transient Key (GTK), an Integrity Group Transient Key (IGTK), and the encryption key to the one or more station devices over the Wi-Fi network, wherein each of the GTK, the IGTK, and the encryption key is encrypted with a Key Encryption key (KEK) generated from a Pairwise Transient Key (PTK); and
   receiving, by the AP device, a fourth message comprising an acknowledgement indicating successful installation of the GTK, the IGTK and the encryption key from the one or more station devices over the Wi-Fi network.

6. The method as claimed in claim 5, wherein the PTK is generated, by the AP device, by applying a pseudo-random function to at least one selected from the group of a prestored Pairwise Master Key (PMK), the ANonce, the SNonce, a Medium Access Control (MAC) address of the AP device, Medium Access Control (MAC) addresses of the one or more station devices, and combinations thereof.

7. The method as claimed in claim 1, wherein transmitting, by the AP device, the encryption key to the one or more station devices over the out-of-band communication medium comprises:
   authenticating the one or more station devices connected to the AP device over a short- range wireless network or a cellular network;
   establishing a secure wireless channel with each of the authenticated one or more station devices; and
   transmitting the encryption key to each of the authenticated one or more station devices through the secure wireless channel.

8. The method as claimed in claim 1, further comprises:
   determining, by the AP device, a distance of each of the one or more station devices; and
   determining whether each of the one or more station devices is present within the predefined region associated with the AP device based on the determined distance.

9. The method as claimed in claim 1, wherein transmitting, by the AP device, the one or more management frames including the cipher text to the one or more station devices comprises:
   encrypting, by the AP device, one or more information elements of the one or more management frames utilizing the encryption key; and
   broadcasting, by the AP device, the one or more management frames to the one or more station devices, wherein each of the one or more management frames comprises a management frame encryption information element and the one or more encrypted information elements.

10. The method as claimed in claim 9, further comprises receiving, by the AP device, a connection request from at least one station device among the one or more station devices in response to broadcasting the one or more management frames.

11. The method as claimed in claim 10, further comprises creating the closed Wi-Fi hotspot network based on the received connection request from the at least one station device.

12. The method as claimed in claim 1, wherein the one or more management frames are a beacon frame, a probe frame or an association frame.

13. The method as claimed in claim 9, wherein the one or more information elements comprises capability information, Service Set Identifier (SSID) information, supported rate information, extended supported rate information, Robust Secure Network (RSN) information, and Basic Service Set (BSS) load information.

14. A station device for connecting to a closed Wi-Fi hotspot network, the station device comprising:
- a processor; and
- a memory coupled to the processor, wherein the memory stores processor-executable instructions, which, on execution, causes the processor to:
  - receive an encryption key from an Access Point (AP) device over an in-band communication medium or an out-of-band communication medium, wherein the station device is present within a predefined region associated with the AP device;
  - receive one or more management frames including cipher text from the AP device over the closed Wi-Fi hotspot network;
  - extract connection information of the AP device by decrypting one or more encrypted information elements of the received one or more management frames using the received encryption key;
  - generate a connection request based on the extracted connection information and a Medium Access Control (MAC) address of the station device; and
  - transmit the generated connection request to the AP device for connecting to the closed Wi-Fi hotspot network in response to receiving the one or more management frames.

15. The station device as claimed in claim 14, wherein the processor is configured to:
- receive the encryption key in one of a plurality of messages associated with handshake-based authentication with the AP device over a Wi-Fi network.

16. The station device as claimed in claim 15, wherein the processor is configured to:
- receive a first message comprising an ANonce from the AP device over the Wi-Fi network;
- transmit a second message comprising a SNonce and a Message Integrity Check (MIC) value to the AP device over the Wi-Fi network in response to receiving the first message;
- receive a third message comprising a Group Transient Key (GTK), an Integrity Group Transient Key (IGTK), and the encryption key from the AP device over the Wi-Fi network, wherein each of the GTK, the IGTK, and the encryption key is encrypted with a Key Encryption key (KEK) generated from a Pairwise Transient Key (PTK); and
- transmit a fourth message comprising an acknowledgement indicating successful installation of the GTK, the IGTK and the encryption key to the AP device over the Wi-Fi network.

17. The station device as claimed in claim 14, wherein the processor is configured to:
- perform authentication with the AP device over a short-range wireless network or a cellular network;
- establish a secure wireless channel with the AP device; and
- receive the encryption key from the AP device through the secure wireless channel.

18. The station device as claimed in claim 14, wherein the processor is configured to transmit a connection request to the AP device in response to receiving the one or more management frames.

19. The station device as claimed in claim 14, wherein the one or more encrypted information elements comprise capability information, Service Set Identifier (SSID) information, supported rate information, extended supported rate information, Robust Secure Network (RSN) information, and Basic Service Set (BSS) load information.

20. A method for creating a closed Wi-Fi hotspot network, the method comprising:
- receiving, by an Access Point (AP) device, a first input for creating the closed Wi-Fi hotspot network;
- receiving, by an AP device, a second input for changing a network identification;
- generating, by the AP device, a random number utilizing a random key generator in response to receiving the second input, wherein the generated random number is set as an encryption key;
- transmitting, by the AP device, the encryption key to one or more station devices over an in-band communication medium or an out-of-band communication medium in response to receiving the first input, wherein the one or more station devices are present within a predefined region associated with the AP device; and
- creating, by the AP device, the closed Wi-Fi hotspot network by communicating one or more management frames including cipher text with the one or more station devices.

* * * * *